US007969478B1

(12) United States Patent
Chen et al.

(10) Patent No.: US 7,969,478 B1
(45) Date of Patent: Jun. 28, 2011

(54) METHOD AND APPARATUS FOR COLOR CORRECTION OF COLOR DEVICES FOR VARIOUS OPERATING CONDITIONS

(75) Inventors: Kok Chen, Sunnyvale, CA (US); Gabriel G. Marcu, San Jose, CA (US); Wei Chen, Palo Alto, CA (US); John Z. Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1351 days.

(21) Appl. No.: 10/419,001

(22) Filed: Apr. 18, 2003

(51) Int. Cl.
*H04N 9/73* (2006.01)

(52) U.S. Cl. .................................. 348/223.1

(58) Field of Classification Search ............. 348/223.1, 348/231.2, 231.3, 231.6, 231.9, 254–256; 345/589–591, 600; 382/167
See application file for complete search history.

(56) References Cited

U.S. PATENT DOCUMENTS

| | | | |
|---|---|---|---|
| 5,612,902 A | | 3/1997 | Stokes |
| 5,670,985 A | | 9/1997 | Cappels, Sr. et al. |
| 5,710,876 A | | 1/1998 | Peercy et al. |
| 5,726,672 A | | 3/1998 | Hernandez et al. |
| 5,929,417 A | * | 7/1999 | Hayashi et al. ............. 235/454 |
| 5,982,416 A | * | 11/1999 | Ishii et al. ................. 348/29 |
| 6,037,950 A | * | 3/2000 | Meir et al. ................. 345/427 |
| 6,480,202 B1 | * | 11/2002 | Deguchi et al. ............ 345/600 |
| 6,535,245 B1 | * | 3/2003 | Yamamoto ................. 348/223.1 |
| 6,816,676 B2 | * | 11/2004 | Bianchi et al. ............. 396/282 |
| 6,844,881 B1 | * | 1/2005 | Chen et al. ................. 345/589 |
| 7,009,640 B1 | * | 3/2006 | Ishii et al. ................. 348/223.1 |

OTHER PUBLICATIONS

International Color Consortium: *Specification ICC.1:Dec. 2001, File Format for Color Profiles* (Version 4.0.0), Apr. 2001.

* cited by examiner

*Primary Examiner* — David L Ometz
*Assistant Examiner* — Carramah J Quiett
(74) *Attorney, Agent, or Firm* — Blakely, Sokoloff, Taylor & Zafman LLP

(57) ABSTRACT

Methods and apparatuses for color correction of color device for various operating conditions. In at least one embodiment of the present invention, operating under a current condition, a color correction operation that is derived from color correction operations defined for other conditions is performed on the color data. In another embodiment, a device profile for managing colors for a color device operating under one condition is interpolated from the device profiles for the color device operating under other conditions (e.g., based on the input received from a user interface according to the perception of the user or based on the measurement of a sensor). The interpolation can be based on the input received from a user interface according to the perception of the user or it can be based on the measurement of a sensor or a set of sensors. Various operating conditions for a color device (e.g., a scanner, a camera, a video camera, a printer, a display device such as a CRT monitor or an LCD display panel, a television set, or others) include chromaticity and illumination of ambient light, background color for a display device, characteristics of print media for a printer, humidity, temperature, pressure and ink level for an ink jet printer, the age of a light source for a scanner, and others.

60 Claims, 21 Drawing Sheets

METHOD AND APPARATUS FOR COLOR CORRECTION OF COLOR DEVICES FOR VARIOUS OPERATING CONDITIONS

FIELD OF THE INVENTION

The invention relates to color devices, and more particularly to color correction for various operating conditions.

BACKGROUND OF THE INVENTION

Color devices include input devices (e.g., scanners, still cameras, video cameras), output devices (e.g., printers), and display devices (e.g., Cathode Ray Tube (CRT) monitors, LCD display panels, television (TV) sets, high definition television sets). The operation of a color device is typically influenced by a number of operating conditions. For example, the scanned image of a scanner may be influenced by the age of the light source of the scanner; the appearance of the output of a printer under a standard viewing condition may be influenced by the characteristic of print media (e.g., paper) and ink level, as well as environment conditions such as humidity, temperature and pressure. The appearance of the image on a display device can be influenced by the background color, the intensity and color of the reflected ambient light.

Many methods to adjust the operation of color devices have been developed to account for the influence of environment conditions. For example, a television set can have a light sensor to automatically adjust the brightness level of the television set according to intensity of the ambient light detected by the light sensor. When the ambient light is bright (e.g., in the day time), the brightness of the television set is automatically increased; and when the ambient light is dim (e.g., at night), the brightness of the television set is automatically decreased.

Due to the variation of the ambient illumination and the observation conditions, the color on a screen may be perceived differently from one viewing condition to another. For example, a gray color may be perceived to be neutral (without color cast) in an office environment but pinkish in the daylight ambient illumination. A more complex situation may arise in the presence of mixed illuminants, for example when the fluorescent light in an office is mixed with the daylight coming through the windows. The viewing condition of a portable computer may change frequently, since the portable computer may be frequently moved to various locations of different environment conditions.

To account for the ambient illumination, some display systems (e.g., as described in U.S. Pat. Nos. 5,670,985 and 5,726,672) compensate the output of a device to offset the reflected ambient illumination. After the user determines the color and intensity of the reflected ambient illumination, the processor uses the tristimulus values of the ambient illumination to determine the bias setting of the device to compensate all outputs generated by the output device for the ambient illumination reflected from the device. The reflected ambient light is subtracted from the displayed color so that the resulting color on the display, under the influence of the ambient light, is the same (having the same tristimulus values) as the color displayed without the influence of the ambient light. In such an approach, the color correction is based on the instrumental measurements (e.g., tristimulus values) of the color. The perception of color from the user and the adaptation of the observer to the ambient illumination and the background colors in the surrounding environment are not considered. However, as the ambient light changes, the adaptation of the observer to the environment causes the observer to change the perception of the color on the screen, even if the color on the screen is corrected to remain colorimetrically the same according to the instrumental measurements. Thus, user experiences show that color adjusted (corrected) in this way may be perceived as having a hue shift (a color cast); and, such an approach may not be the preferred solution from the point of view of perceived color for an observer.

Some systems allow users to select a white point (e.g., along a black body curve, which represents the color of the light emitted by a theoretical "black body" at different absolute temperatures) and the target gamma, a well known parameter that characterizes the nonlinear intensity correction for CRT signals. However, adjusting the white point temperature and the target gamma may not be enough to compensate the influence of the ambient light. For example, when the screen color appears to have a hue shift of colors other than greenish or pinkish (purplish), the adjustment of the white point temperature may not be able to correct the color and remove the hue shift. If the display is calibrated for daylight illumination, the display may look greenish under office fluorescent illuminant; and, there is no way to correct such a hue shift based on the white point temperature adjustment; this may cause frustration for the user in not being able to adjust the color of the display to its preferences with the limited resources available for changing only the white point temperature of the display.

A color correction operation typically includes gamma correction, white point correction, color matching (or mapping), and others. It is understood that, in this application, the typical adjustment of the brightness level of a display device, which may be performed manually by a user through a control button or automatically according to the measurement of a light sensor, is not considered a color correction operation.

SUMMARY OF THE DESCRIPTION

Methods and apparatuses for color correction of color device for various operating conditions are described here.

In at least one embodiment of the present invention, a color correction operation is performed for a color device operating under a current condition. The color correction operation for the current condition is derived through interpolation of device profiles that are defined for other conditions. The interpolation can be based on the input received from a user interface according to the perception of the user; or, it can be based on the measurement of a sensor (or a set of sensors). The color device can be a scanner, a camera, a video camera, a printer, a display device such as a CRT monitor or an LCD display panel, a television set, or others. Operating conditions for a color device can include chromaticity and illumination of ambient light, background color for a display device, characteristics of print media for a printer, humidity, temperature, pressure and ink level for an ink jet printer, the age of a light source for a scanner, among others.

In another aspect of the invention, a method for managing colors for a color device includes the generation of a first device profile for the color device from a plurality of second device profiles for the color device. The first device profile corresponds to the color device operating under a first condition; and, the plurality of second device profiles correspond to the color device operating under a plurality of second conditions. In one example, color correction is performed for the color device operating under the first condition using the first device profile (e.g., by converting between a first color data for the color device operating under the first condition and a second color data according to the first device profile). In another example, each of the first condition and the plurality of second conditions is quantified by at least one parameter; and, the first device profile is generated from an interpolation of the plurality of second device profiles according to the at least one parameter. Each of the first device profile and the plurality of second device profiles is defined in a device profile space; and, the interpolation according to the at least one parameter is constrained in a subspace of the device profile space. The first device profile is generated from a combination of the plurality of second device profiles according to an input that indicates a relation between the first condition and the plurality of second conditions. In another example, the input is received from a sensor, which quantifies at least one parameter for the first condition; and, the first device profile is generated from an interpolation of the plurality of second device profiles according to the at least one parameter. In another example, the input is received from a user interface; the input specifies weights for the plurality of second device profiles; the first device profile is an average of the plurality of second device profiles weighted according to the weights; feedback is provided to demonstrate one or more colors (e.g., a plurality of grays including white and black) corrected according to the first device profile in response to the input. In another example, the color device is a display device; and, the feedback is displayed on the display device operating under the first condition.

In another aspect of the invention, a method for correcting color for a color device operating under various conditions includes performing a first color correction operation for the color device operating under a first condition according to a first input and a plurality of second color correction operations for the color device operating under a plurality of second conditions, where the first input indicates a relation between the first condition and the plurality of second conditions. In one example, input is received from a user interface to define the plurality of second color correction operations for the color device operating under the plurality of second conditions and to calibrate the plurality of second color correction operations according to the perspective of a user; the plurality of second color correction operations correct a color data for a plurality of grays (e.g., black and white) to maintain a consistent white point according to the perspective of the user for the color device operating under the plurality of second conditions respectively. In another example, the first input is received from a sensor, which quantifies at least one parameter; the first input comprises the at least one parameter for the first condition; and, the first color correction operation is an interpolation of the plurality of second color correction operations according to the at least one parameter. In another example, the first input is received from a user interface; the first input specifies weights for the plurality of second conditions; and, the first color correction operation is an average of the plurality of second color correction operations weighted according to the weights. Feedback is provided to demonstrate one or more colors (e.g., a plurality of grays) corrected by the first color correction operation in response to the first input. In one example, the color device is a display device; and, the feedback is displayed on the color device operating under the first condition. In another example, a first device profile is generated for the color device operating under the first condition from the first input and a plurality of second device profiles, which correspond to the plurality of second color correction operations for the color device operating under the plurality of second conditions respectively. The first color correction operation is performed by applying the first device profile (e.g., by converting between a first color data for the color device operating under the first condition and a second color data according to the first device profile). In one example, each of the first device profile and the plurality of second device profiles are defined in a device profile space; and, the first device profile is generated from an interpolation constrained in a subspace of the device profile space according to the first input.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description that follow.

BRIEF DESCRIPTION OF THE DRAWINGS

The present invention is illustrated by the way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
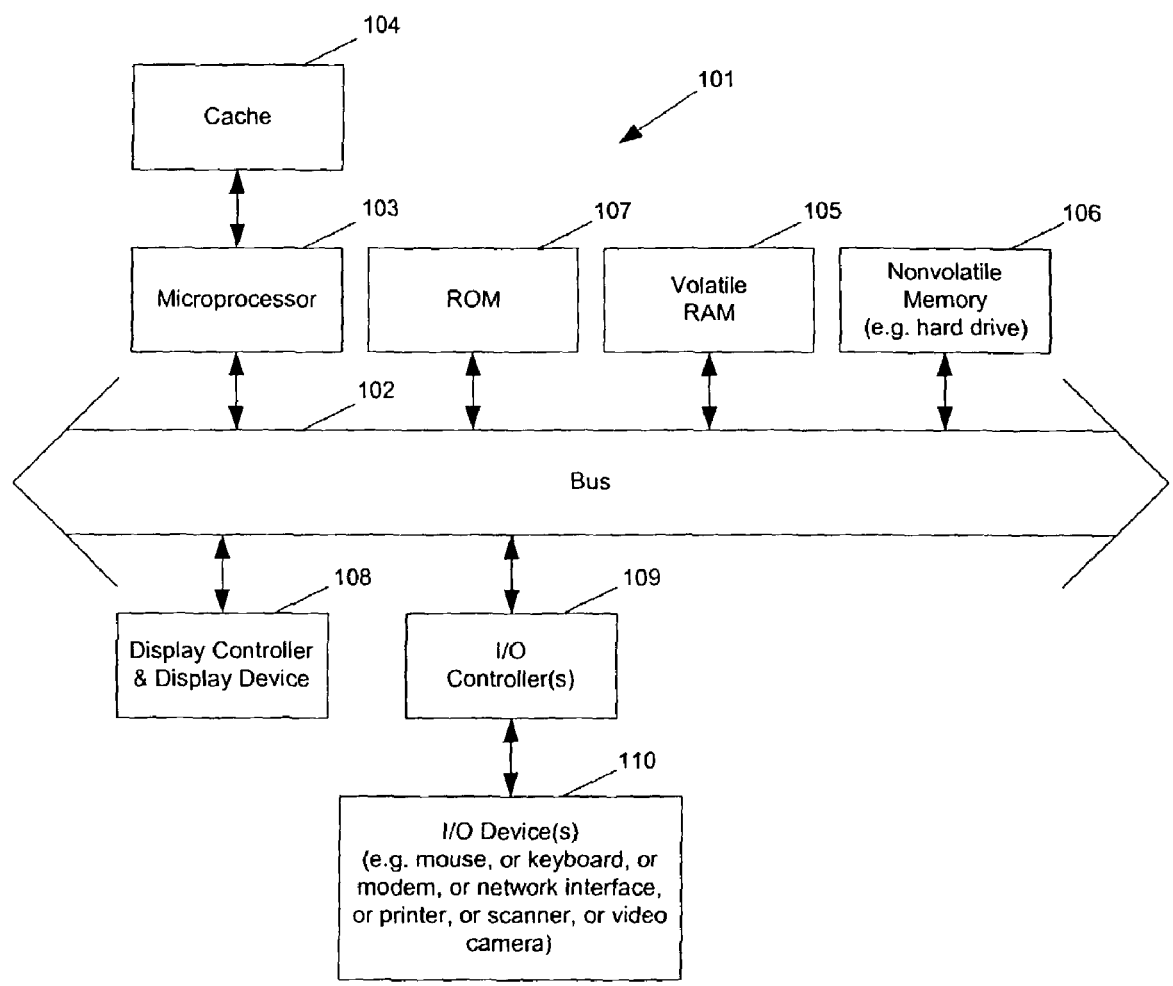
FIG. 1 shows a block diagram example of a data processing system which may be used with the present invention.

FIG. 1 shows one example of a typical computer system that may be used with the present invention. Note that while FIG. 1 illustrates various components of a computer system, it is not intended to represent any particular architecture or manner of interconnecting the components as such details are not germane to the present invention. It will also be appreciated that network computers and other data processing systems that have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 that is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) that requires power continually in order to refresh or maintain the data in the memory. The non-volatile memory 106 is typically a magnetic hard drive or a magnetic optical drive or an optical drive or a DVD RAM or other type of memory systems that maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the 110 controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine-readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

At least one embodiment of the present invention seeks to perform a color correction operation for a color device operating under a current condition based on the color correction operations defined for the color device operating under other conditions; and, interpolations, based on user input or sensor measurements, are performed to derived the color correction operation for the current operating condition from the color correction operations for the other operating conditions. Many examples are illustrated using a display device (e.g., a computer monitor, an LCD display panel, a color TV). However, from this description, it will be apparent to one skilled in the art that many methods of the present invention illustrated using a display device can also be used for other color devices, such as scanners and printers.

Figure 2:
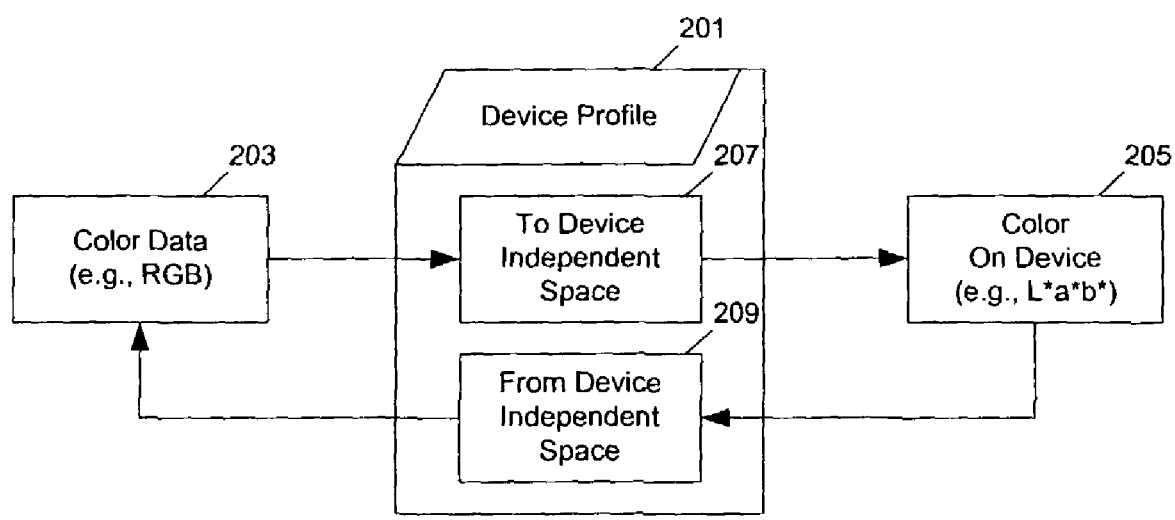
FIG. 2 illustrates examples of color conversion using a device profile for a color device.

FIG. 2 illustrates a device profile for a color device. A device profile characterizes the relation between the color data (e.g., color components detected, color components to be printed or displayed) for the device and the color on the device (e.g., color to be scanned, color print-out, or color displayed). Color data for the device is generated from or used to generate the color on the color device. A typical device profile 201 includes data for converting between color on device 205, which is typically represented in a device independent color space (e.g., L*a*b*) as a result of instrumental measurements, and color data 203, which is typically represented in a device dependent color space (e.g., RGB) as a signal generating, or being generated from, the color on device. For example, data 207 is used to convert color data 203 to color on device 205; and, data 209 is used to convert color on device 205 to color data 203. Thus, device profile 201 is essentially a digital representation of the color conversion capability of the color device. The device profile can be in terms of a gamma, a look up table or matrix for chromaticity data, and/or other parameters. Typically, the device profile is represented in a multi-dimensional space.

When a color data is converted to the color on the device according to a device profile and converted back to another color data according to another device profile, the result is a color correction to account for the differences between the devices. Thus, a number of device profiles can be created for a color device operating under a number of different conditions so that color correction can be performed using the device profiles.

However, it is understood that color correction operations may not be based on device profiles. For example, a color correction operation may be represented in terms of a conversion function (or a look up table) that maps uncorrected color data to corrected color data.

Figure 3:
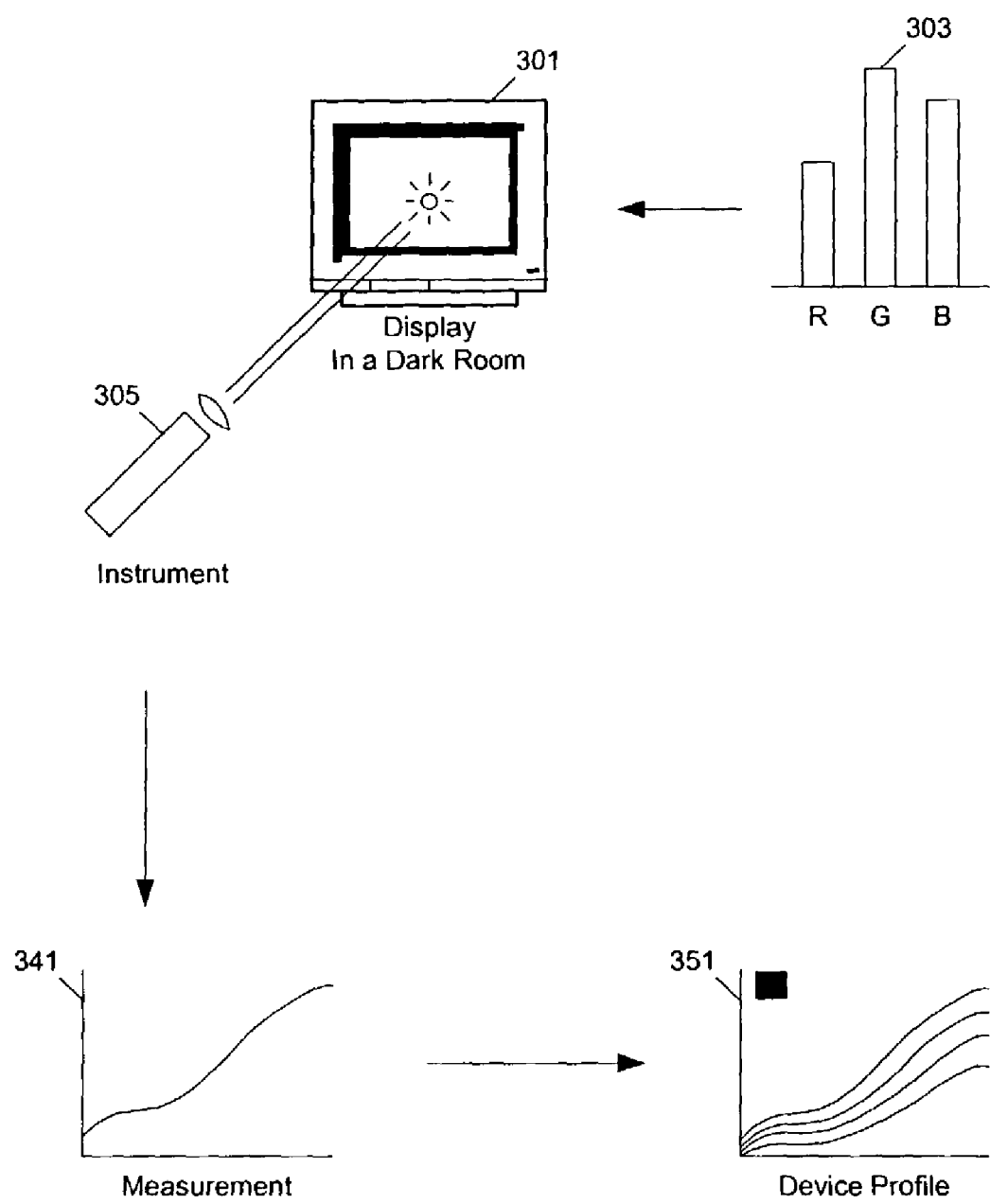
FIGS. 3-5 show a method to generate device profiles for various environment conditions.
Figure 4:
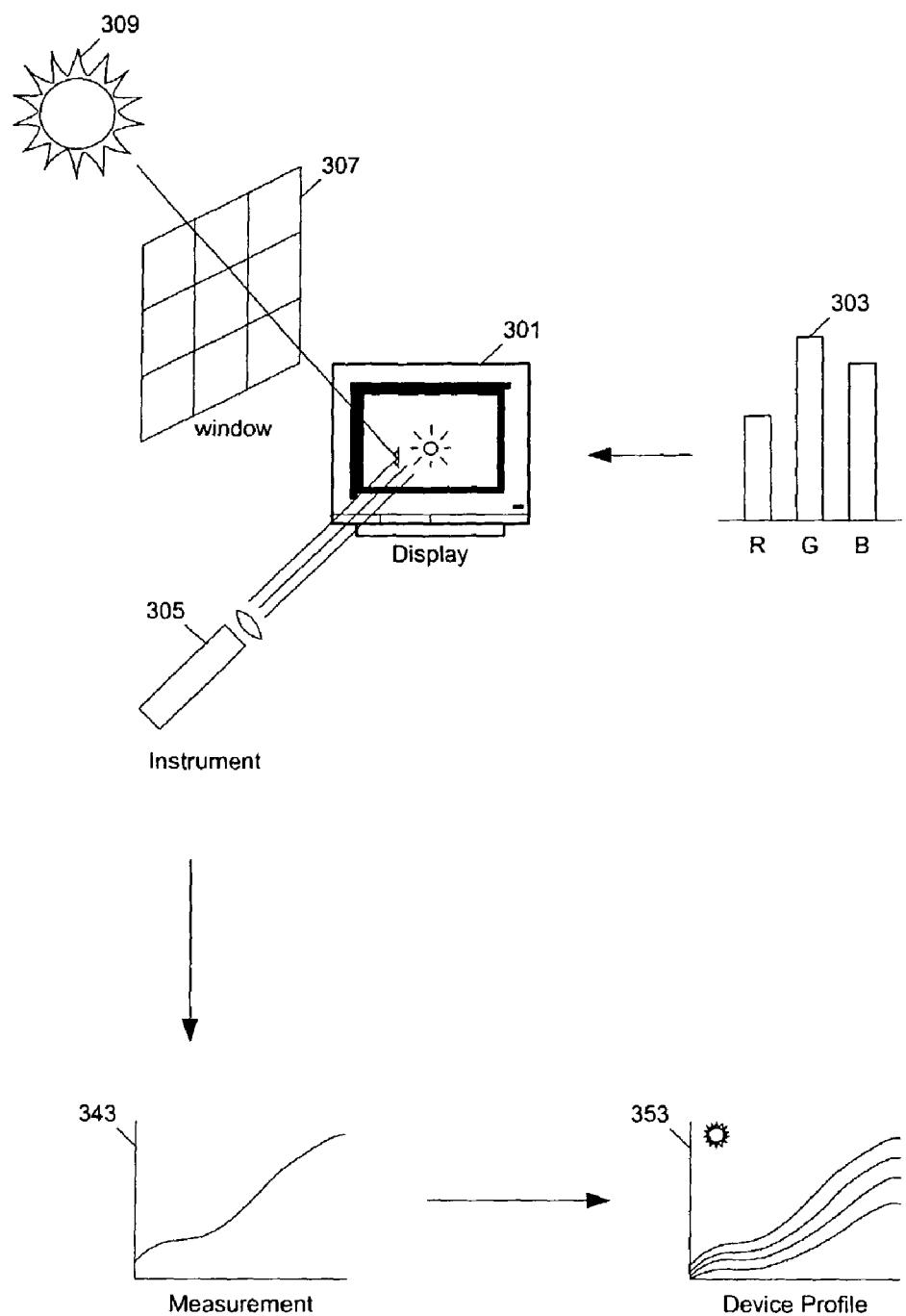
Figure 5:
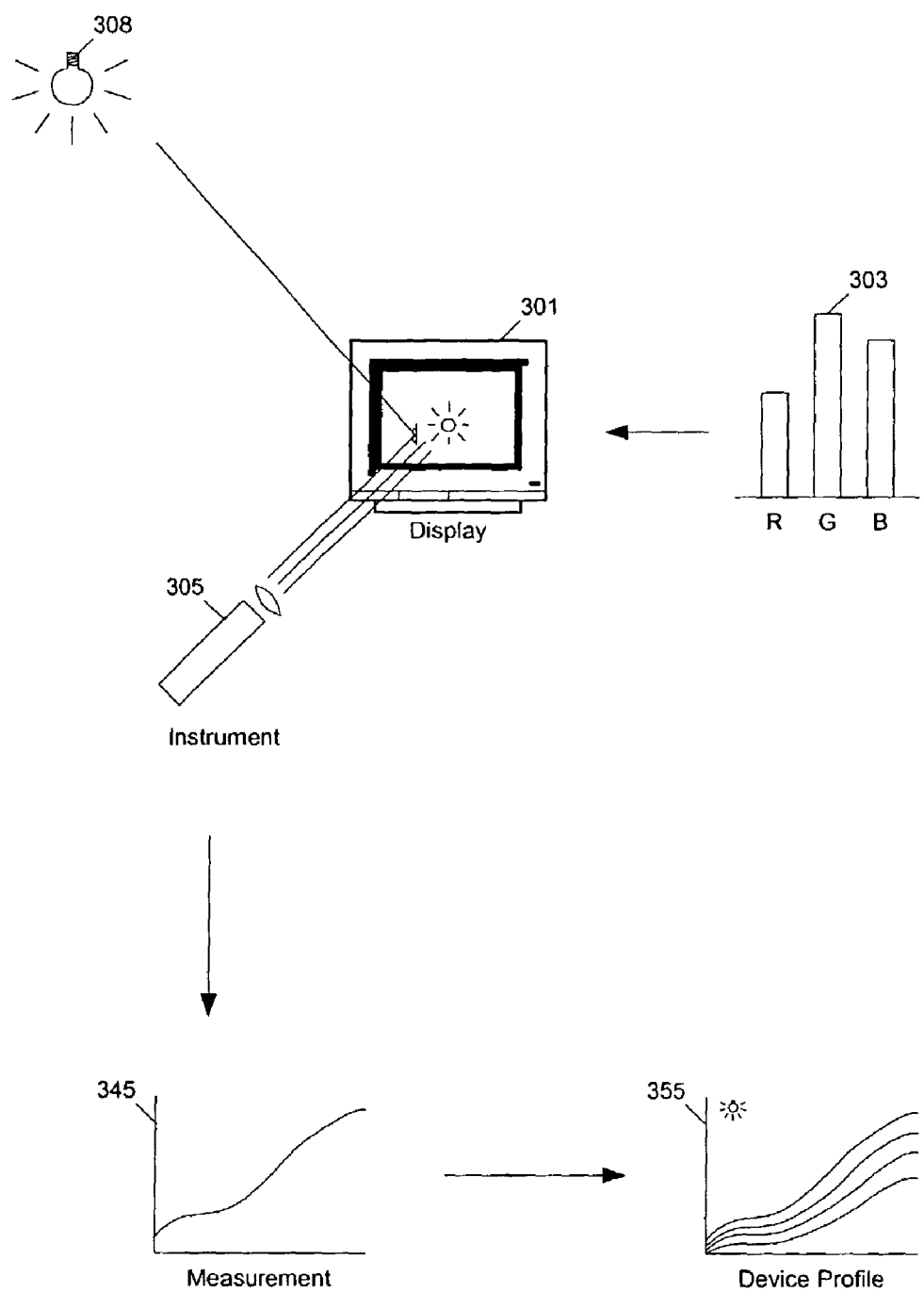

FIGS. 3-5 show a method to generate device profiles for various environment conditions. In FIG. 3, the color on display 301 driven by color data 303 in a dark room is measured by instrument 305 to produce color measurements 341. Typically, a number of different color measurements corresponding to a number of different color data for driving the display are used to generate device profile 351 for the display in a dark room.

Similarly, in FIG. 4, the color on display 301 driven by color data 303 in a room with window 307 is measured by instrument 305 to produce color measurements 343. Since daylight 309 coming through window 307 is reflected by display 301, measurements 343 include the contributions both from the reflected daylight and from the light driven by color data 303. Thus, the generated device profile 353 includes the influence of the daylight. Similarly, in FIG. 5, measurements 345 include the reflected light from illuminant 308; and, device profile 355 includes the influence of the ambient light due to illuminant 308.

Device profiles 351, 353, 355 for display device 301 under different viewing condition can be used to perform color corrections. For example, color correction can be performed to match the measured color displayed in a dark room and the measured color displayed under daylight 309 or under illuminant 308.

Figure 6:
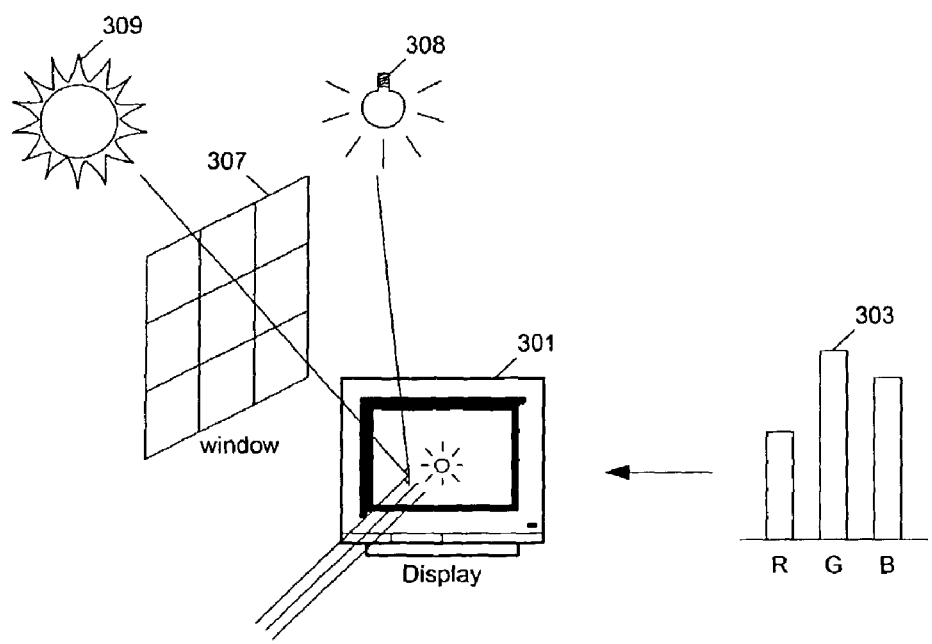
FIG. 6 shows a method to estimate a device profile for an environment condition from device profiles for other environment conditions according to one embodiment of the present invention.
Figure 6:
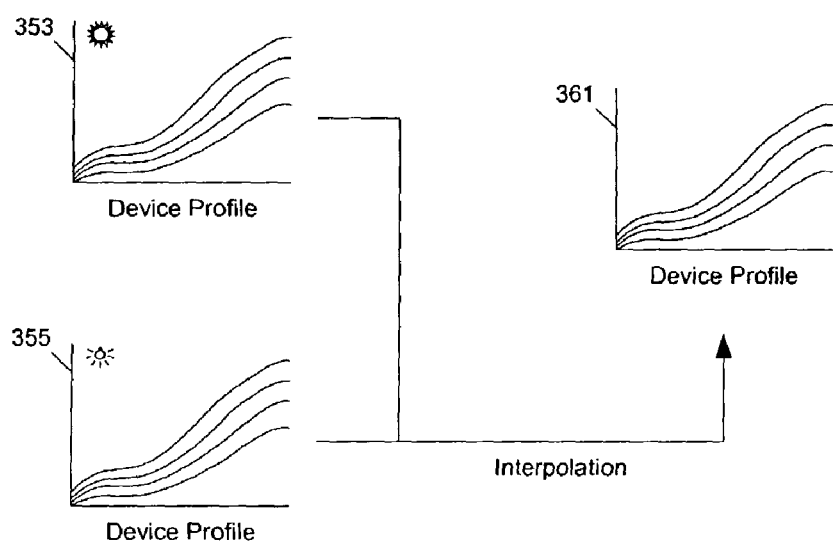

When display device 301 is operating under a mixture of daylight 309 and illuminant 308, as illustrated in FIG. 6, device profiles 353 and 355 can be used to estimate a device profile for the display in the mixed illumination condition. Through an interpolation scheme (a weighted averaging scheme, or other schemes for combination), device profile 361 is computed from device profiles 353 and 355. Thus, the view condition with the mixed illumination condition can be accounted for without having to perform detailed measurements with an instrument.

Figure 7:
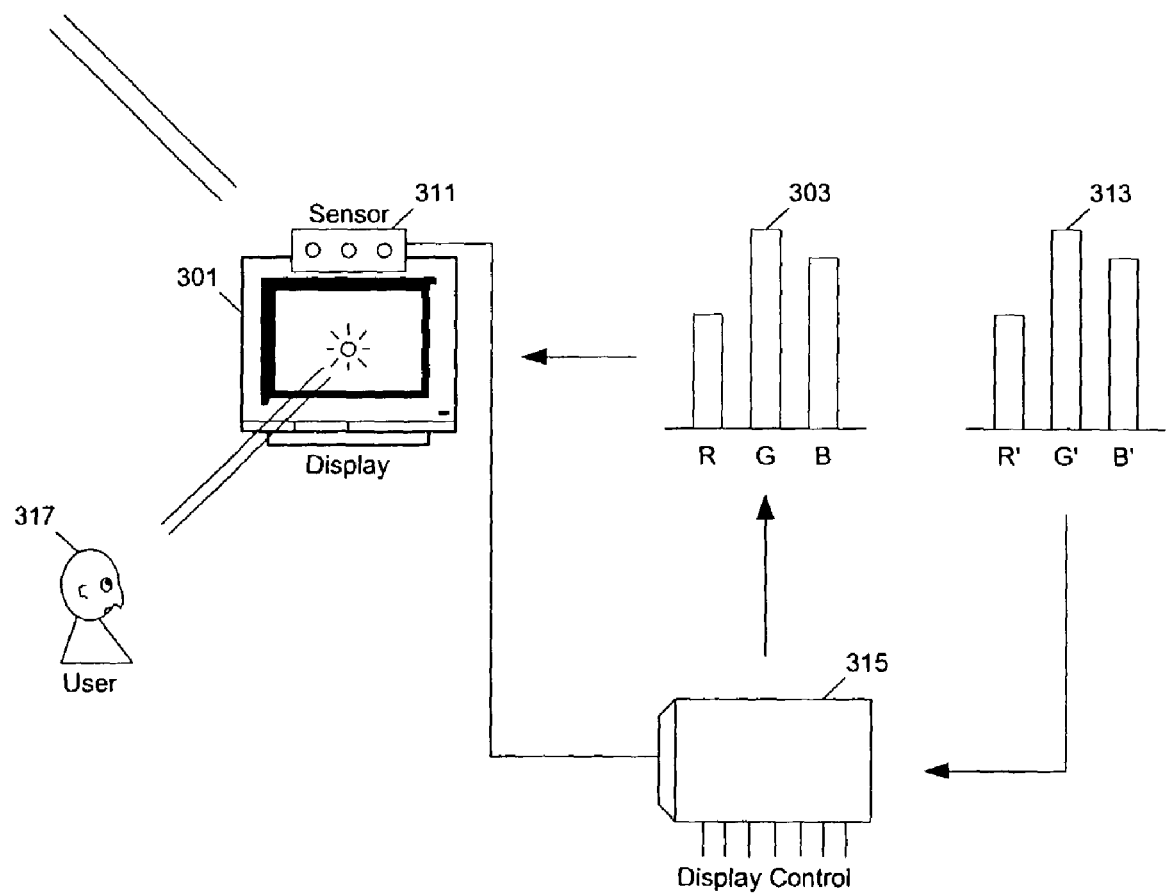
FIG. 7 shows a method to use a sensor to control a display device according to the environment condition according to one embodiment of the present invention.

FIG. 7 shows a method to use a sensor to control a display device according to the environment condition according to one embodiment of the present invention. Sensor 311 quantified the view condition from its measurement. Display control 315 generates color data 303 from color data 313 according to the measurement of the sensor to compensate for the influence of the view condition. In one embodiment of the present invention, color data 313 is corrected so that the color perceived by user 317 is the same as (or close to) the color perceived without the influence of the ambient light. More details are described below.

Figure 8:
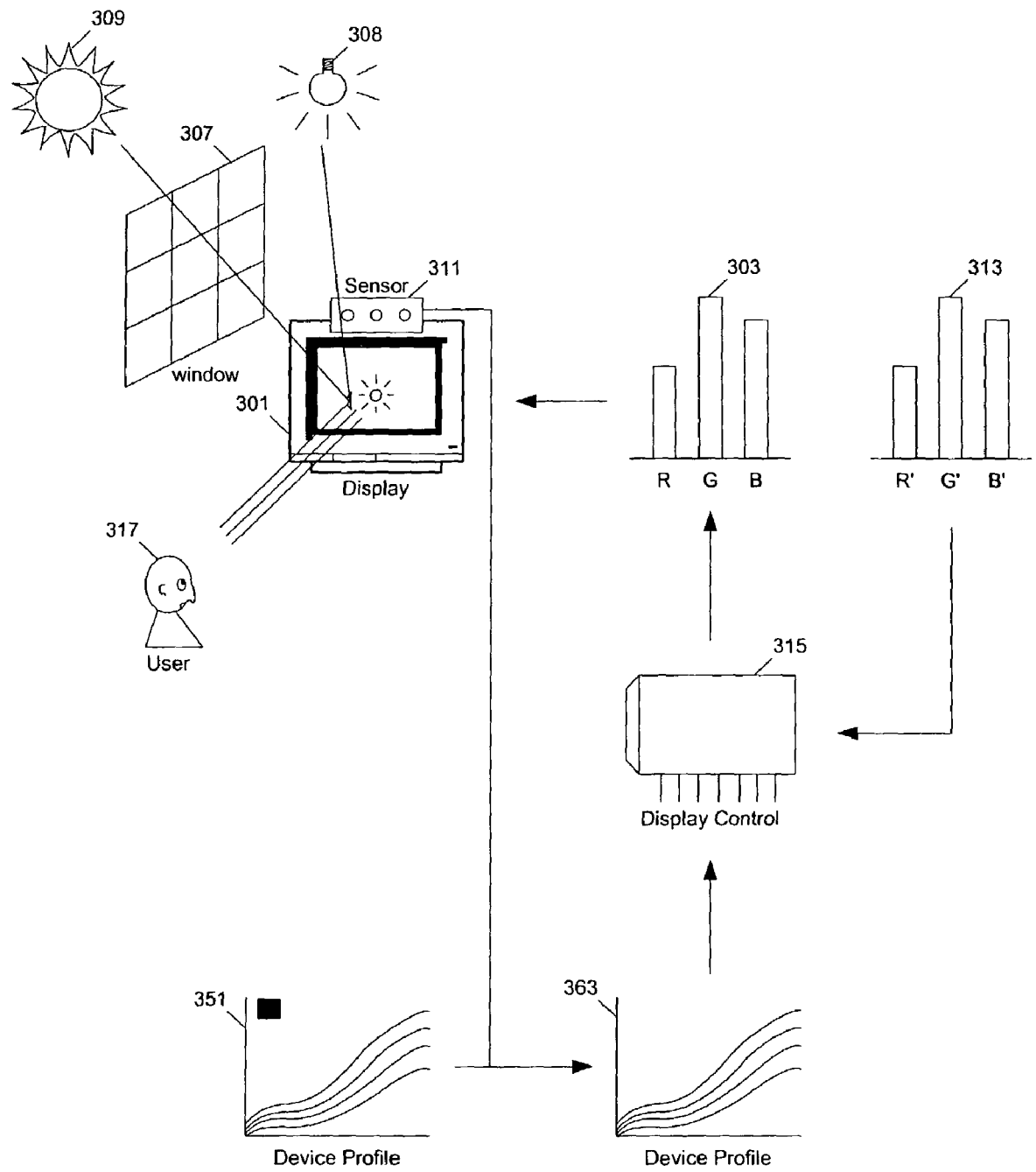
FIG. 8 shows a method to compensate the ambient light measured by a sensor.

FIG. 8 shows a method to compensate the ambient light measured by a sensor. Sensor 311 measures the ambient light from illuminants 308 and 309. From device profile 351 for the display operating in a dark room and the measurement of the ambient light, device profile 363 is generate for the current viewing condition, which can be used to control display control 315 to perform color correction.

However, the color correction according to device profile 363 (or 353) accounts for only the influence of the ambient light to the measured color; and, no adaptation of the user to the environment is considered. In one embodiment of the present invention, a device profile also includes the user preference in how the user sees the color correction. The perception of the user is "the instrument" that tells the user what is the correct perceptual profile for a viewing environment. In one viewing environment, the user prefers a certain adjustment; in another viewing environment, the user may prefer a different adjustment. In different environments, the differences in colorimetric measurements cannot account for the differences in perceived color experienced by the user. The difference in color perceived by the user in different viewing environment is coming from the fact that the eyes of the user adapt to the environment according to the viewing condition. The environment is mostly reflective; and therefore, its color is mostly dependent on the incident ambient light. However, the surface of a display screen is typically self luminous; and, the color perceived from the screen in the environment of a viewing condition is a mixture of the influence of the incident light and the color produced by the screen itself. Thus, the perceived color changes differently from the color of the environment as the result of the chance in viewing conditions. Therefore, the device profile created in one viewing condition according to the perception of a user is different from the device profile created for the same viewing conditions according to the colorimetric measurements, where the difference accounts for the influence of the viewing environment on the user perception to the perceived color on the screen. In other words the user adaptation changes once the viewing environment is changed, which influences the perceived color from the screen. Examples of device profiles that include the user preferences in how the user sees the color correction are described further below.

Further, the accuracy of the color correction based on device profile 363 depends on deriving an accurate measurement of the reflected ambient light from the measurement of sensor 311. The measurement of sensor 311 typically is not as accurate as instrument 317 for reduced cost. Further, the measurement of sensor 311 does not include the characteristics of the display in reflecting the ambient light. Thus, device profile 363 may be adjusted in order to perform high quality color correction.

Figure 9:
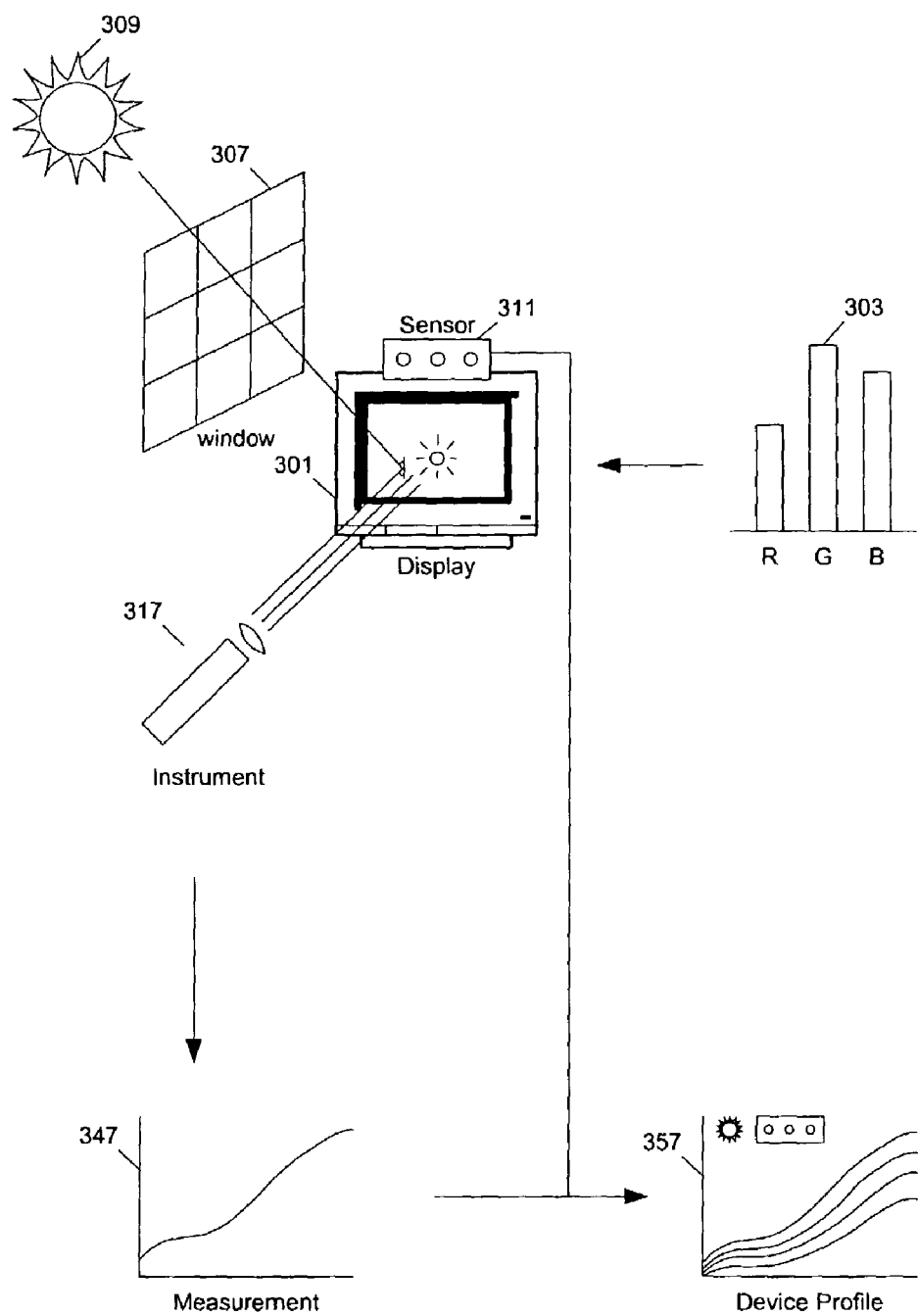
FIG. 9 shows a method to correlate device profile with sensor measurement according to one embodiment of the present invention.

FIG. 9 shows a method to correlate device profile with sensor measurement according one embodiment of the present invention. Similar to generating device profile 353 in FIG. 4, device profile 357 is obtained from measurement 347 of instrument 317 under the daylight illumination through window 307. The measurement of sensor 311 is quantified to correlate the condition of the ambient light with the device profile. Once the measurement of the sensor is correlated with a number of device profiles under different illumination conditions, the measurement of the sensor can be used to estimate a device profile for the current illumination condition from the known device profiles.

Figure 10:
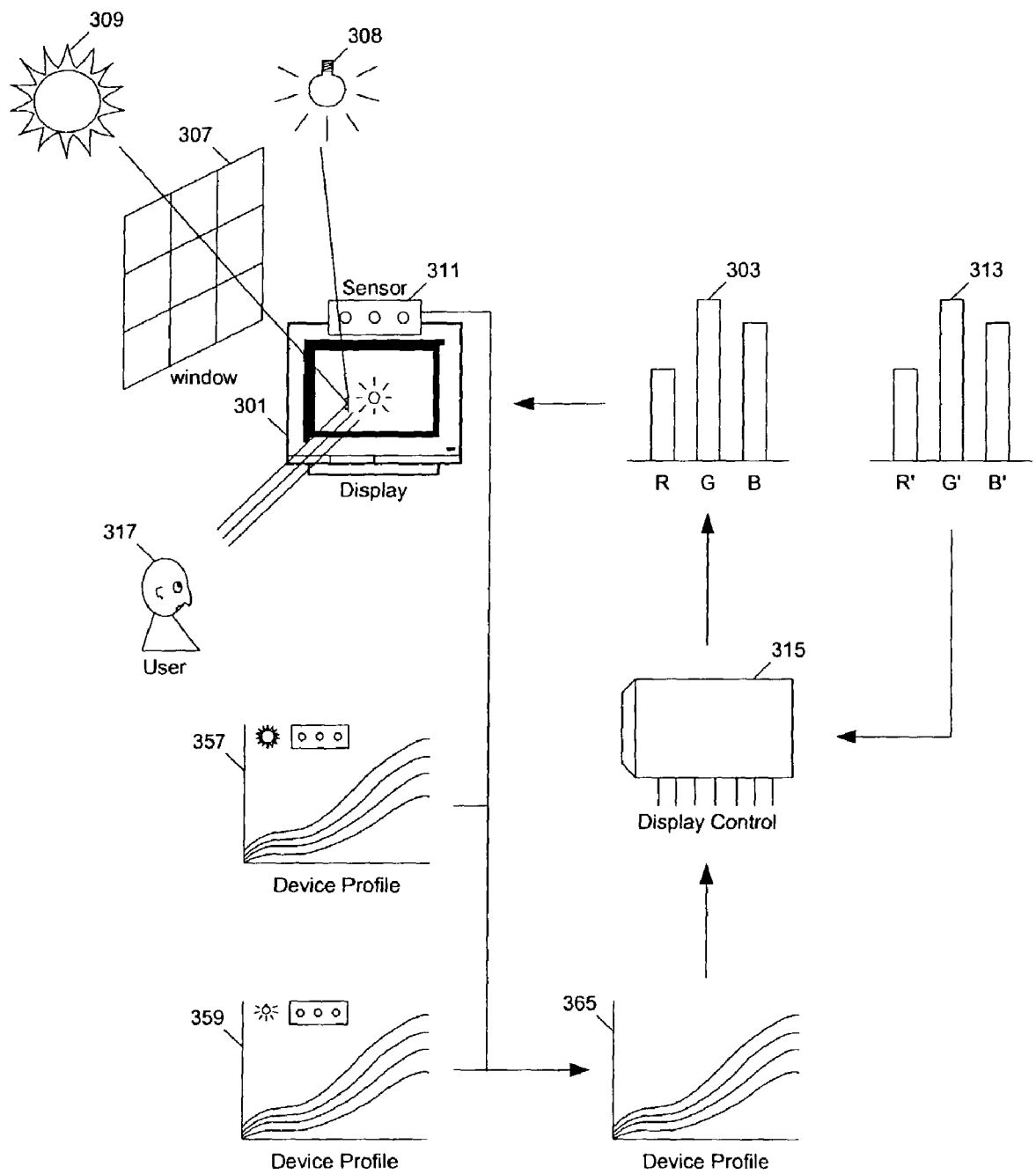
FIG. 10 shows a method to automatically perform color correction using the measurement from a sensor and the device profiles for different environment conditions correlated with sensor measurements.

FIG. 10 shows a method to automatically perform color correction using the measurement from a sensor and the device profiles for different environment conditions correlated with sensor measurements. Since measured device profiles 357 and 359 are correlated with the measurement of sensor 311, the measurement of sensor 311 can be used to generate device profile 365 from an interpolation based on device profiles 357 and 359. Display control 315 is then automatically controlled by the current device profile (e.g., 365) to perform color correction.

Figure 11:
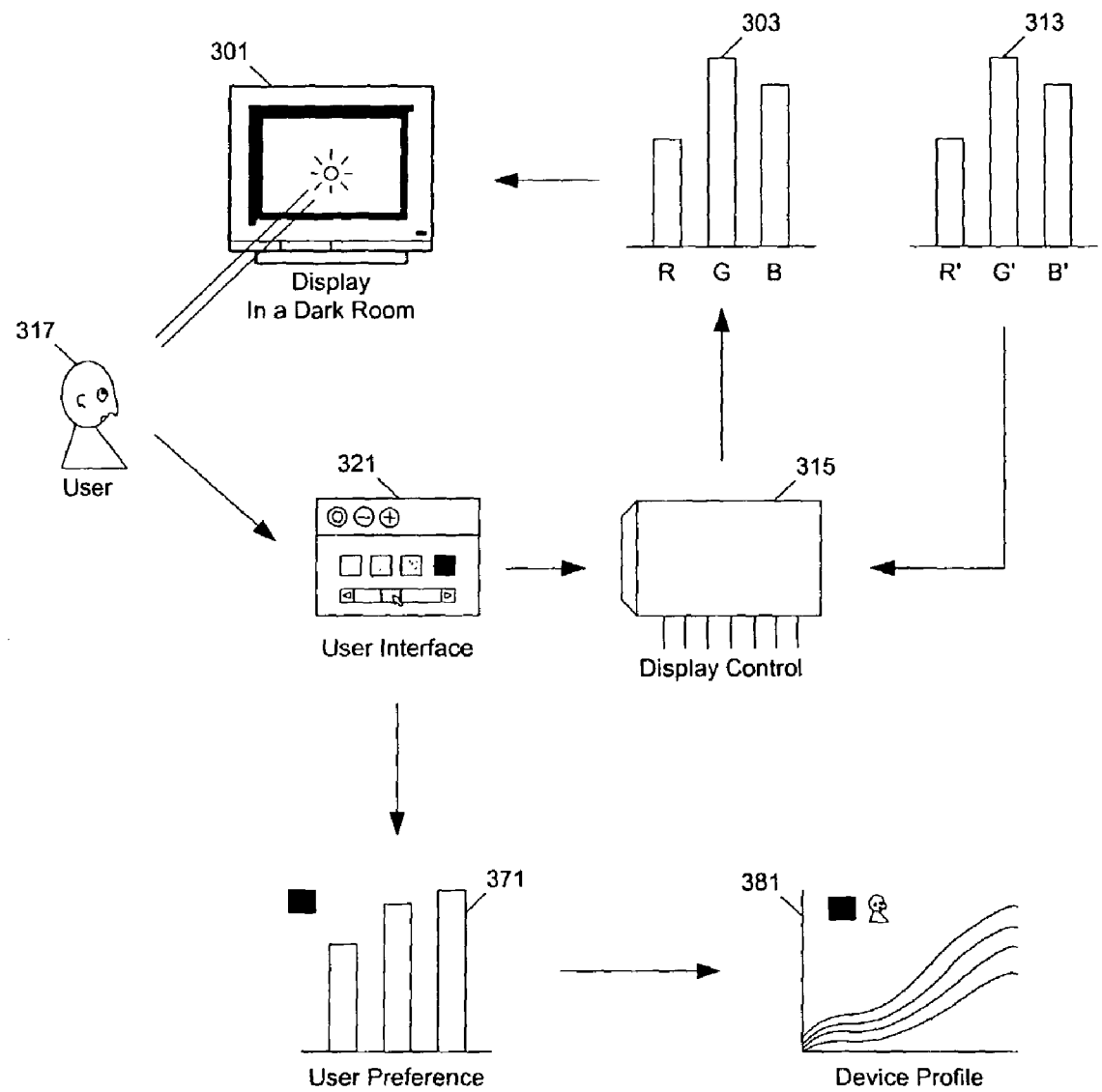
FIG. 11 shows a method to generate a device profile in an environment condition based on the user preference according to one embodiment of the present invention.

FIG. 11 shows a method to generate a device profile in an environment condition based on the user preference according to one embodiment of the present invention. A user interface 321 is used for the user to adjust display control 315 to perform color correction according to the preference of user 317. User 317 interactively adjusts the controls of user interface 321, which may be displayed on display 301, to generate user preference 371 and view the result generated according to the user preference. When the user is satisfied with the color adjustments, device profile 381 generated from user preference 371 (e.g., from combining the user preference 371 and a dark room profile 351) is used for the color correction of display 301.

Figure 12:
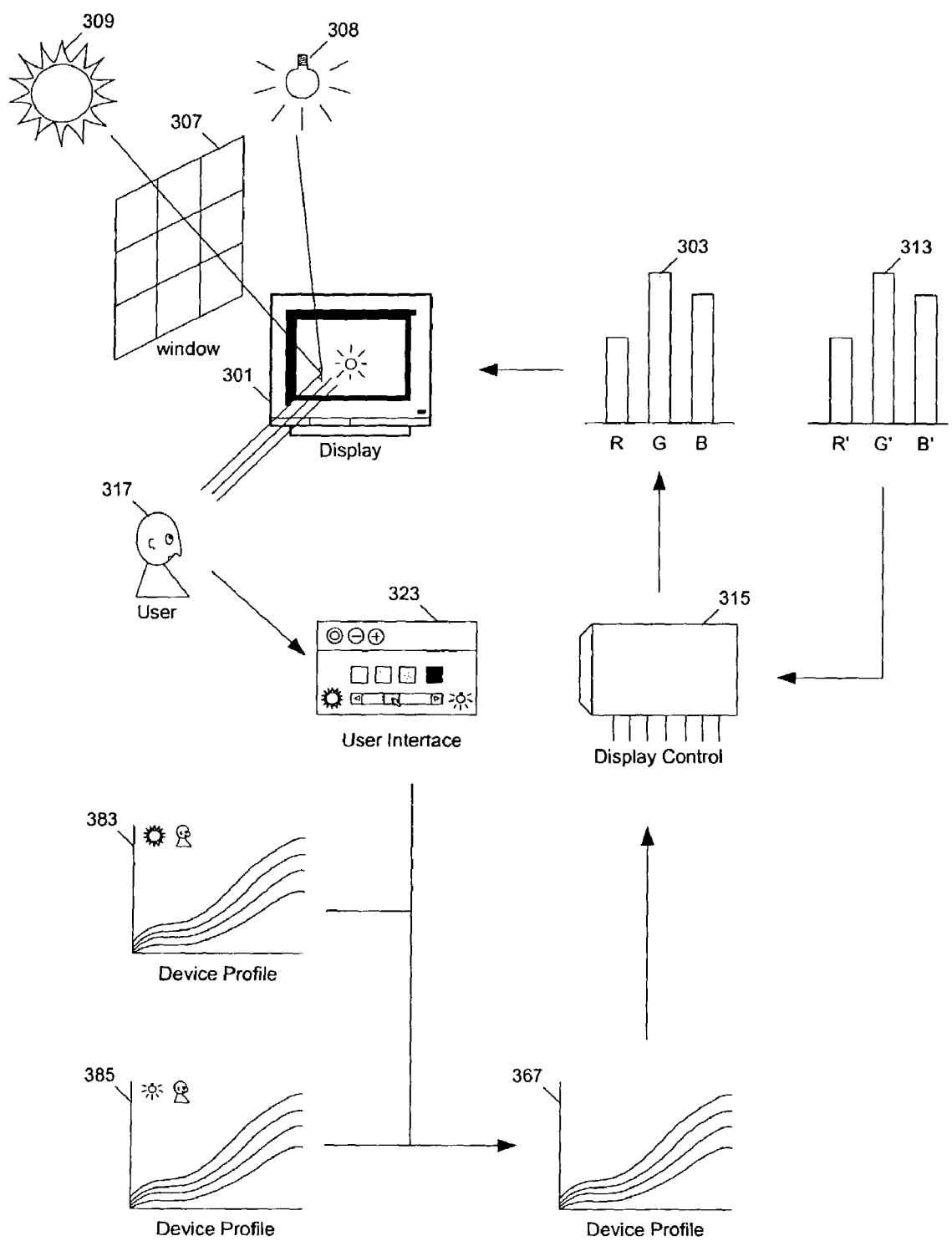
FIG. 12 shows a method to perform color correction based on user input and user preferences for different environment conditions according to one embodiment of the present invention.

FIG. 12 shows a method to perform color correction based on user input and user preferences for different environment conditions according to one embodiment of the present invention. When the user has a number of device profiles generated for a number of different viewing conditions, user interface 323 can be used by user to select an interpolation of the device profiles so that resulting device profile 367 provides a satisfactory color correction according to the perception of the user. An interpolation of the device profiles constrains the resulting device profile in a reasonable region in the device profile space so that the user can easily accomplish the task. Since selecting an interpolation is typically much easier than adjusting the user preference through user interface 321, a user can easily select a satisfactory device profile for color correction under the current viewing condition from user interface 323. In one embodiment of the present invention, a plurality of colors (e.g., grays) are displayed on user interface 323 on display 301 according to the current device profile 367 so that the user can interactively select a satisfactory device profile. When a plurality of different gray values (including black and white) are displayed, the user can adjust the device profile to maintain a consistent white point. When the user selects a satisfactory device profile, the adaptation of the user to the environment is also taken into account.

Figure 13:
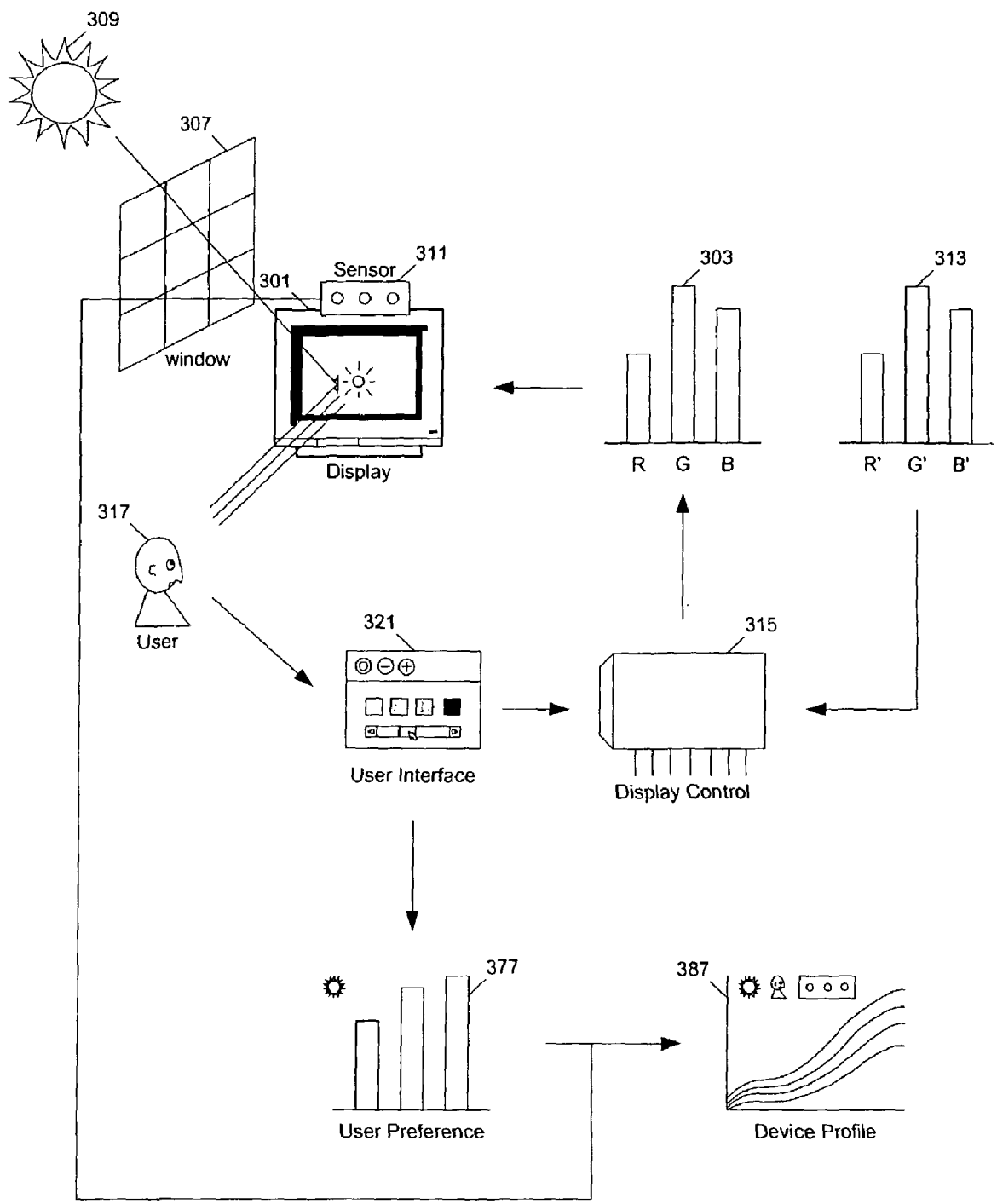
FIG. 13 shows a method to correlate user preference with sensor measurement according to one embodiment of the present invention.
Figure 14:
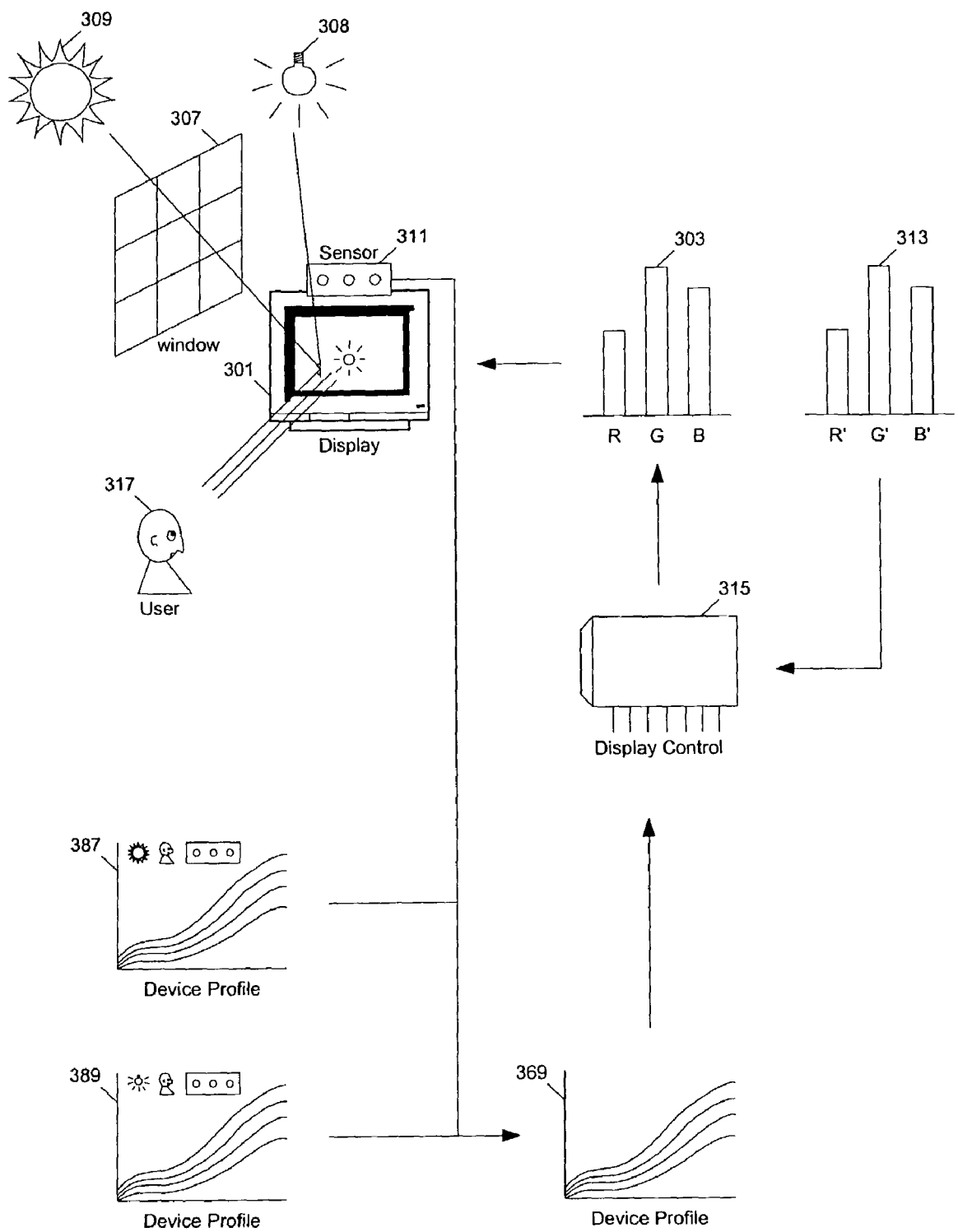
FIG. 14 shows a method to automatically perform color correction using the measurement from a sensor and the user preferences for different environment conditions correlated with sensor measurements.

FIG. 13 shows a method to correlate user preference with sensor measurement according one embodiment of the present invention. Similar to correlating device profiles measured by an instrument with the measurement of a sensor, the preference of the user and the corresponding device profile can be correlated with the measurement of the sensor. Once the device profile (e.g., profile 387) calibrated according to the user preference (e.g., preference 377) is correlated with the sensor measurement, an interpolation operation can be automatically performed to obtain the current device profile according to the sensor measurement, as illustrated in FIG. 14. FIG. 14 shows a method to automatically perform color correction using the measurement from a sensor and the user preferences for different environment conditions correlated with sensor measurements. Device profile 369 is generated from an interpolation of device profiles 387 and 389 according to the sensor measurement. Since device profiles 387 and 389 are calibrated according to the preference of the user, the perception and adaptation of the user is also included in the generated device profile 369.

Figure 15:
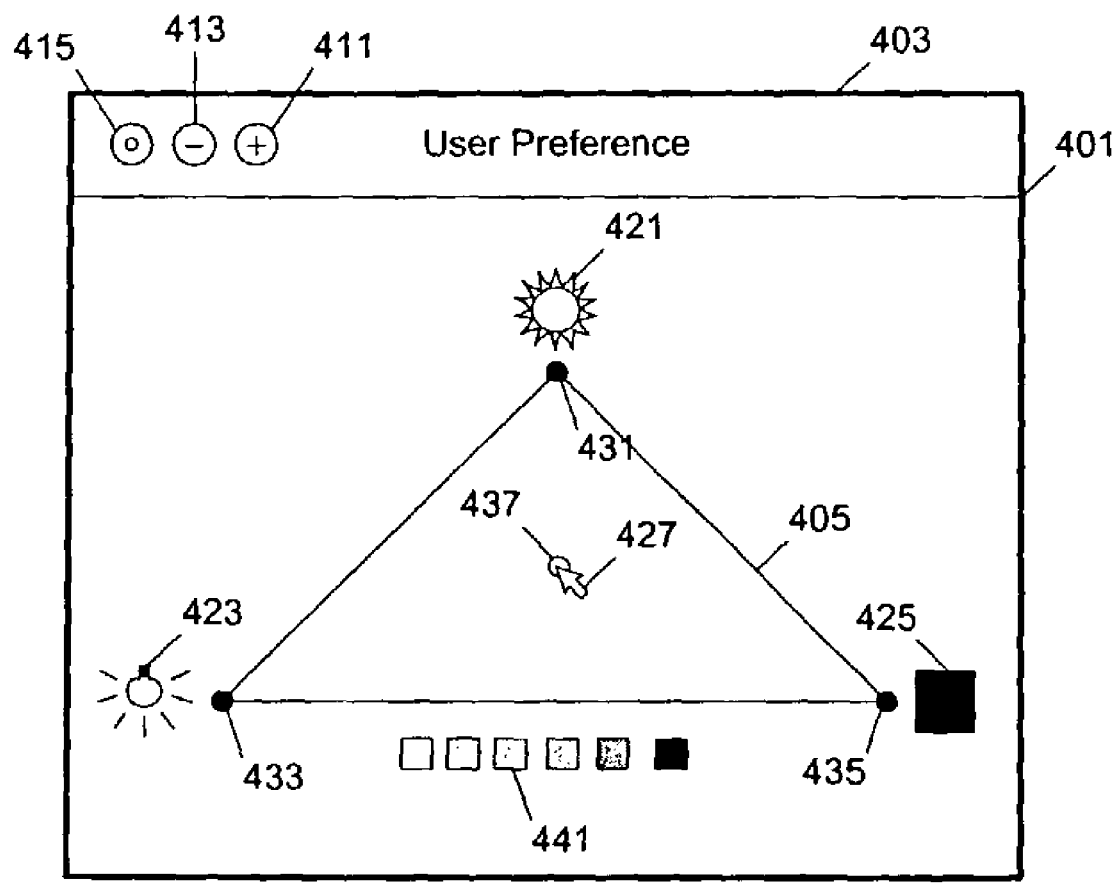
FIG. 15 shows a Graphical User Interface (GUI) for receiving user input to interpolate between three device profiles for color correction according to one embodiment of the present invention.

FIG. 15 shows a Graphical User Interface (GUI) for receiving user input to interpolate between three device profiles for color correction according to one embodiment of the present invention. Window 401 has title bar 403, which contains buttons 411, 413 and 415 for maximizing, minimizing and closing window 401. Window 401 displays triangle 405 that represents the region of device profile interpolated from device profiles represented by icons 421, 423 and 425. For example, icon 421 represents the device profile of a display operating under the daylight illumination; icon 423 represents the device profile of the display operating under incandescent (or fluorescent) light illumination; and icon 425 represents the device profile of the display operating in a dark room. Circle 437 represents the desired combination of the three device profiles. When circle 437 is selected (e.g., by dragged by cursor 427, selected by cursor 427, or commanded through a voice recognition system) to be coincide with point 431 (or 433, or 435), the device profile represented by icon 421 (or 423, or 435) is used; when circle 437 is located at other positions, a device profile computed from an interpolation (e.g., a weighted average) from the device profiles represented by icons 421, 423 and 425 is used. For example, a weighted average procedure can be used to combined the device profiles; and, the weights for the corresponding device profiles are determined from the position of circle 437 relative to points 431, 433 and 435 (e.g., the weights for device profiles are proportional to the area of triangles, each of which is formed by circle 437 and two of the three vertices of triangle 405). In one embodiment of the present invention, an extrapolation is performed when circle 437 is located outside triangle 405. It is understood in this application that an extrapolation is a special form of an interpolation scheme. When the position of circle 437 is selected, a device profile is computed and used to display a number of colors (e.g., grays) to provide the feedback of the color corrected according to the current device profile. For example, a number of grays (e.g., 441) can be displayed so that a user can adjust the position of circle 437 to obtain white point consistent gray levels (e.g., to eliminate the color cast, or hue shift, for the current viewing condition).

Figure 16:
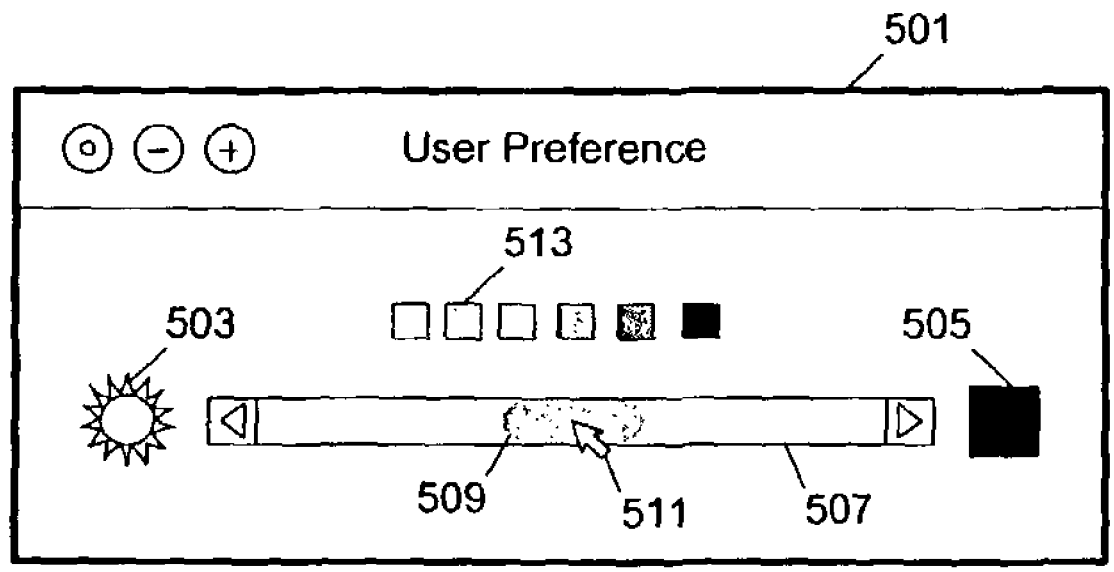
FIG. 16 shows a Graphical User Interface (GUI) for receiving user input to interpolate between two device profiles for color correction according to one embodiment of the present invention.

FIG. 16 shows a Graphical User Interface (GUI) for receiving user input to interpolate between two device profiles for color correction according to one embodiment of the present invention. Similar to triangle 405, scroll bar 507 is used for a user to select a combination of the device profiles represented by icons 503 and 505. A user may control cursor 511 to drag thumb 509 to the left end of the scroll bar to select the device profile represented by icon 503, to the right end of the scroll bar to select the device profile represented by icon 505, or to a position in between to select a particular combination of the two device profiles. A number of blocks (e.g., block 513) is used to display of the gray levels according to the current display device profile under the current viewing condition. A user can interactive adjust the position of thumb 509 to obtain a preferred display of gray levels.

Although FIGS. 15 and 16 illustrate examples of user interfaces for selecting a combination of device profiles according to the preference of a user, it would be apparent from this description to one skilled in the art that various different implementations can be used to provide an user interface for interactively selecting a combination from a number of device profiles. Since the device profiles represented by the icons in FIGS. 15 and 16 are used for defining an interpolation, these device profiles do not have to be real device profiles. These device profiles can be obtained according to the method in FIG. 4 from the measurement of an instrument, or according to the method in FIG. 11 based on the preference of the user, or other methods. In one embodiment of the present invention, these device profiles are initially pre-designed according to the perception of one observer and calibrated by experts of the manufacture of the device. A user can first select user calibrated device profiles according to the perception of the user from the interpolation of the pre-designed device profiles and then replace these device profiles with the user calibrated device profiles.

Figure 17:
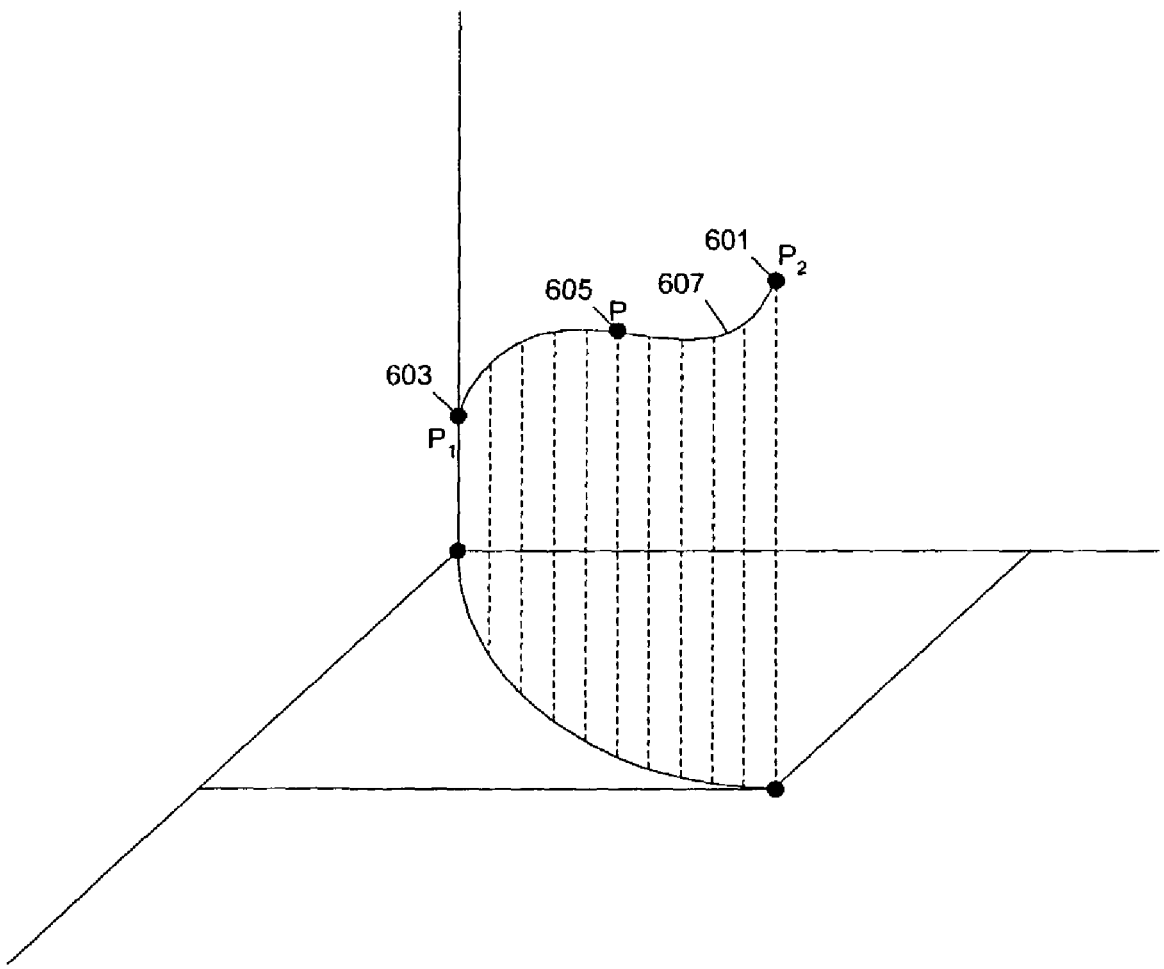
FIGS. 17-18 illustrate the interpolation of device profiles in reduced device spaces according to one embodiment of the present invention.
Figure 18:
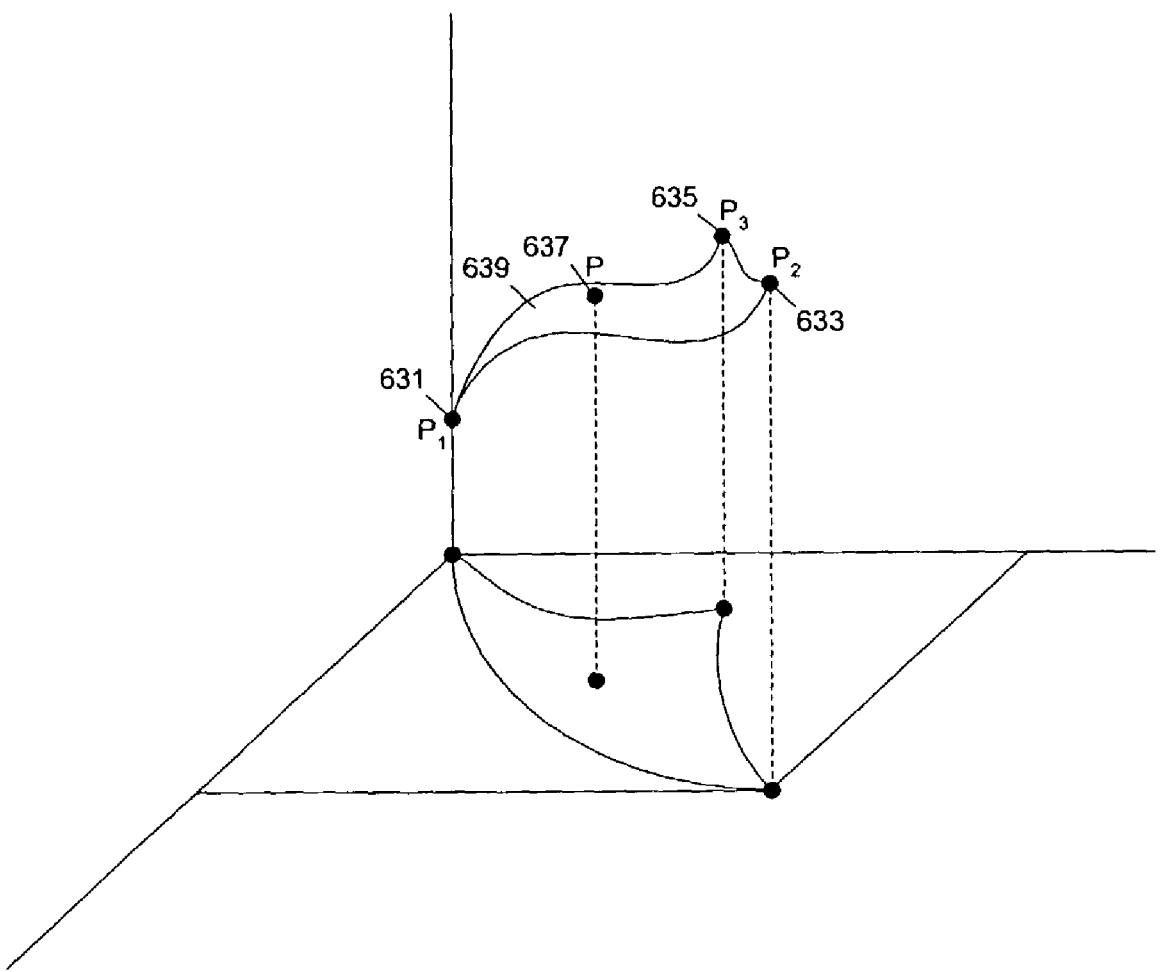

FIGS. 17-18 illustrate the interpolation of device profiles in reduced device spaces according to one embodiment of the present invention. Typically, a device profile is represented in a multi-dimensional space. Thus, a user has the option to adjust a large number of parameters to specify a preferred device profile for a given operating condition. However, unconstrained adjustments are difficult to achieve a satisfactory result and often not desirable for a user; and, over-constrained adjustments (e.g., based on the white point temperature) may not have greenish pinkish adjustments to provide satisfactory results. According to one embodiment of the present invention, the adjustment of the device profile is constrained to a reduced device space based on a plurality of supporting device profiles. For example, in FIG. 17, two supporting device profiles 603 and 601 are represented as two points in the device space. An interpolation based on an input parameter constrains the adjustment of the device profile on curve 607. Thus, it is much easy for an user to perform the adjustment along the curve (e.g., through the control of a stroll bar) to obtain a satisfactory result. An interpolation scheme can be used to define the path of the curve. Without such constraints, a user may over adjust certain parameters and be frustrated by the difficulty in getting a desirable result. Similarly, points 631, 633 and 635 in FIG. 18 can be used to define an interpolation surface 639 so that a user can easily adjust the position of point 637 on the surface using an interpolation scheme. Typically, a device profile is represented by a large number of parameters, which can be very difficult to adjust and control individually. When an interpolation scheme is used to combine a plurality of device profiles, the adjustment can be easily carried out by a user or performed automatically according to the measurement of a sensor.

The support points (e.g., points 631, 633 and 635 in FIG. 18) in the device space are generated according to the preference of a user in one embodiment of the present invention. A user may directly adjust the parameters of a device profile to generate a support point. Adjusting the parameters of the device profile typically takes a longer period of time to produce a satisfactory result. However, it gives the user the full control to reach a preferred appearance. Alternatively, experts (e.g., the designer of the manufacturer) can perform the calibrations for various viewing conditions to provide the support points for a user to calibrate according to the preference of the user. Pre-designed device profiles (e.g., generated from the calibration by experts for the device at a number of extreme viewing conditions) that support a broad range for adjustment the appearance of the display can be used as support points in an interpolation scheme for a user to calibrate according to the preference of the user. Once the user calibrates the device profiles for a number of viewing conditions, an interpolation can be performed based on the user calibrated device profiles. Further, the user's calibration (e.g., using an interpolation of the pre-designed device profiles) can be correlated with the measurement of the sensor that is attached to the display device so that the device profile can be automatically adjusted from an interpolation scheme based on the measurement of the sensor for the current viewing condition.

From this description, it would be apparent to one skilled in the art that device profile interpolation can be used to provide easy and reliable ways to control a color device to correct colors for various operating conditions.

In various examples of the present invention, device profiles calibrated for various operating conditions (e.g., viewing conditions) are used for colors correction. However, it would be apparent to one skilled in the art that the methods for combining the device profiles can also be used to combining color correction functions (e.g., user preferences) when the color correction operations are defined in terms of color correction functions based on a device profile for a standard viewing condition (e.g., a display operated in a dark room). Since the color correction functions define the modifications to the device profile for the device under the standard viewing condition, the color correction functions essentially define the device profiles for the device operating under various viewing conditions. Thus, color correction functions are considered as a representation of device profiles.

Figure 19:
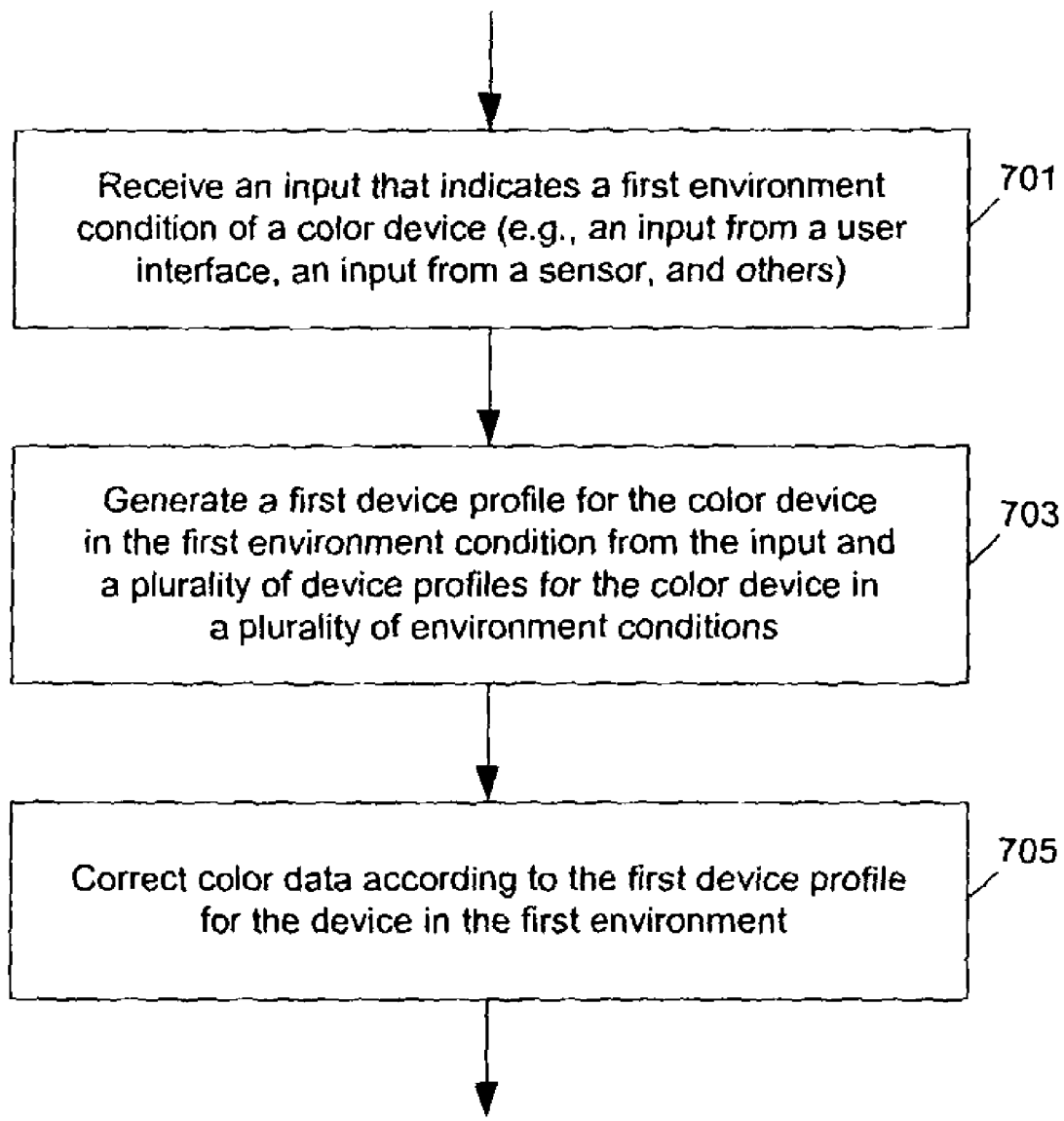
FIGS. 19-21 illustrate flow charts of color correction methods according to embodiments of the present invention.
Figure 20:
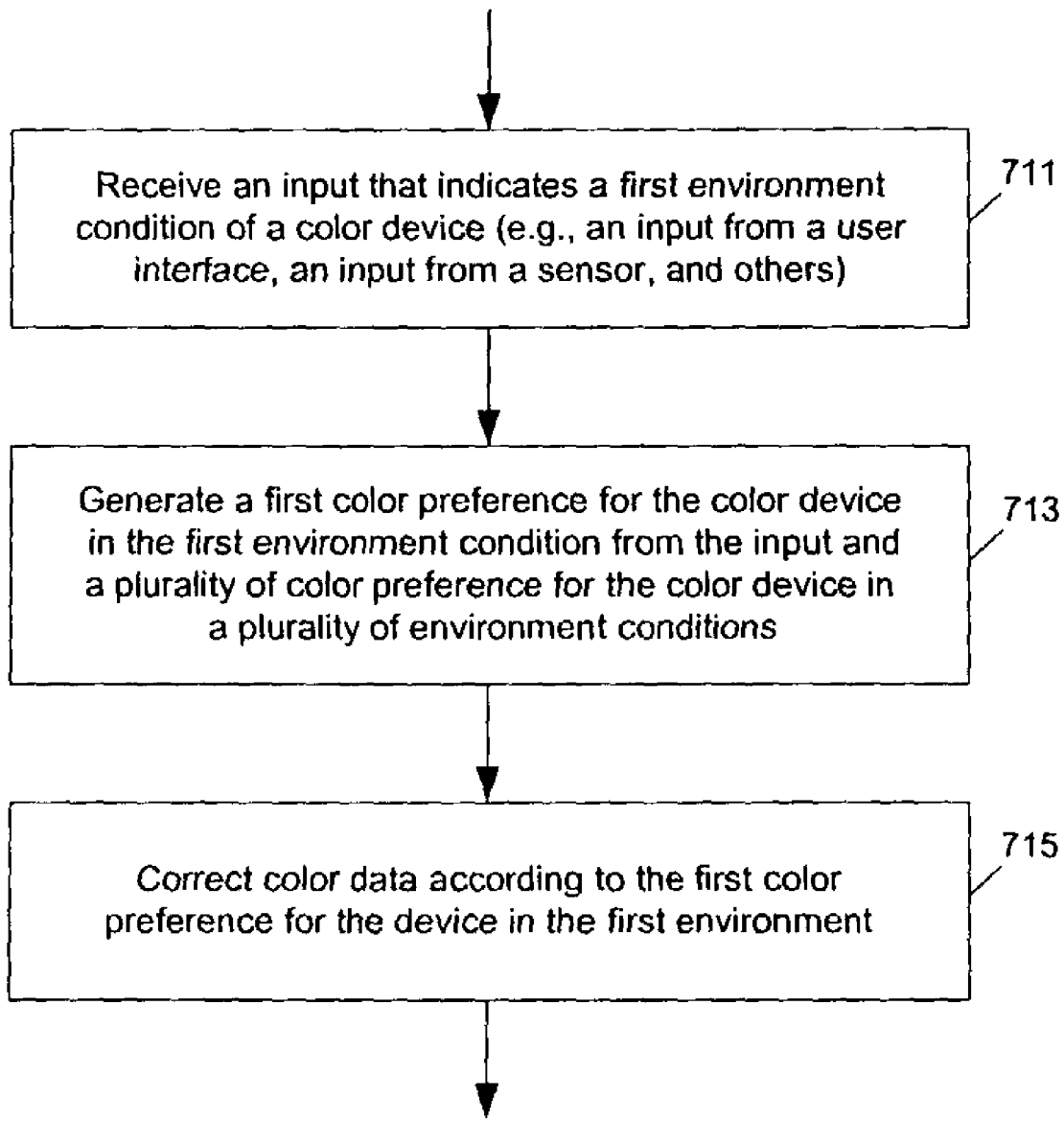
Figure 21:
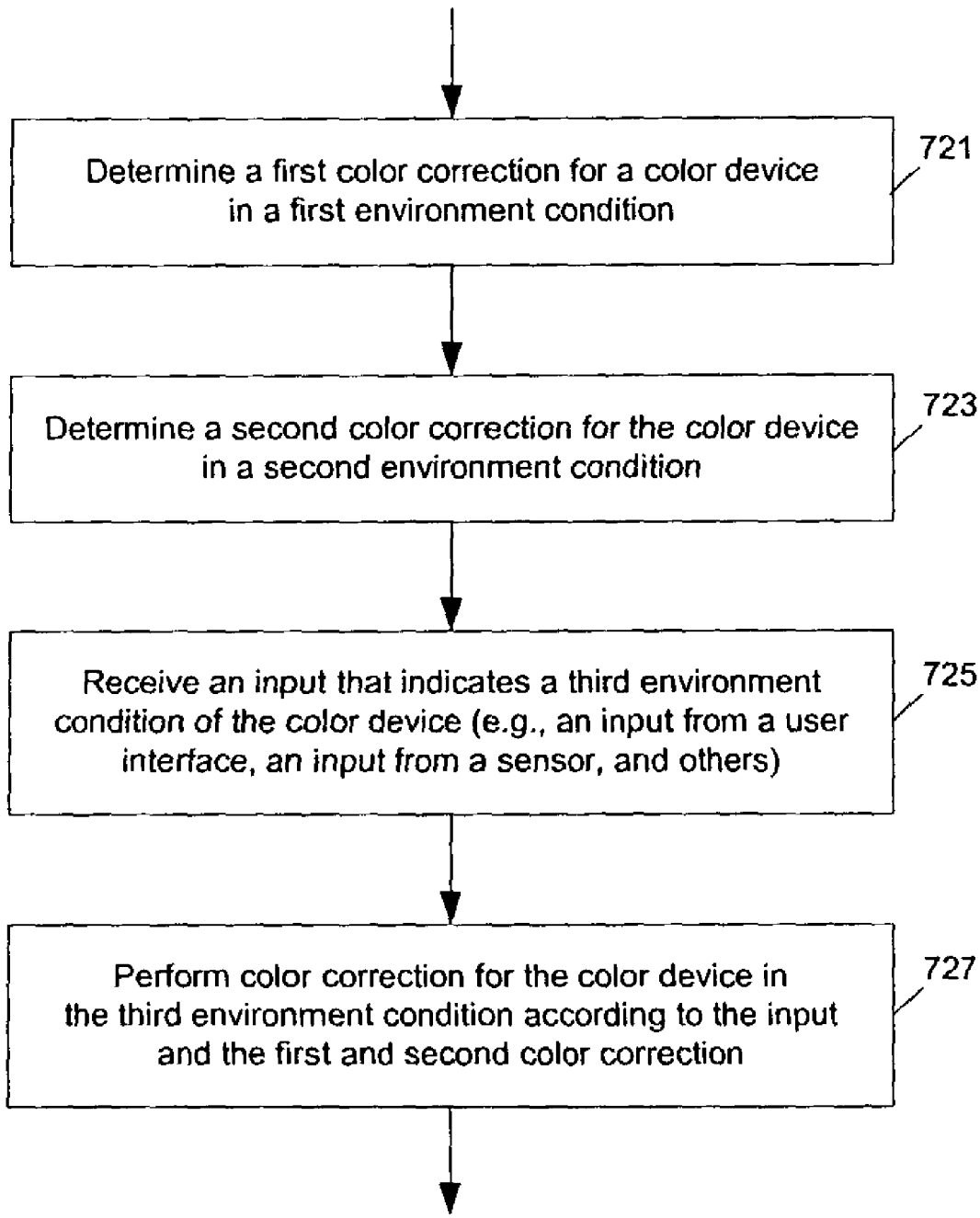

FIGS. 19-21 illustrate flow charts of color correction methods according to embodiments of the present invention.

FIG. 19 shows a method to perform color correction according to a plurality of device profiles calibrated for a plurality of conditions. After operation 701 receives an input that indicates a first environment condition of a color device (e.g., an input from a user interface, an input from a sensor, and others), operation 703 generates a first device profile for the color device in the first environment condition from the input and a plurality of device profiles for the color device in a plurality of environment conditions. Operation 705 corrects color data according to the first device profile for the device in the first environment.

Color preferences of a user for a specific viewing condition are encapsulated in a device profile. FIG. 20 shows a method to perform color correction according to a plurality of color preferences calibrated for a plurality of conditions. After operation 711 receives an input that indicates a first environment condition of a color device (e.g., an input from a user interface, an input from a sensor, and others), operation 713 generates a first color preference for the color device in the first environment condition from the input and a plurality of color preference for the color device in a plurality of environment conditions. Operation 715 corrects color data according to the first color preference for the device in the first environment.

FIG. 21 shows a method to calibrate the display according to the user preference. Operation 721 determines a first color correction for a color device in a first environment condition according to the perception of a user; and, operation 723 determines a second color correction for the color device in a second environment condition according to the perception of the user. After operation 725 receives an input that indicates a third environment condition of the color device (e.g., an input from a user interface, an input from a sensor, and others), operation 727 performs color correction for the color device in the third environment condition according to the input and the first and second color correction. In one embodiment of the present invention, the measurement of a sensor (or a number of sensors) is used to quantify the environment condition using one or more parameters. The first and second color corrections are determined when the device is operated under the corresponding environment conditions so that the measurement of sensor under the first and second environment conditions are correlated with the first and second color corrections; and, the color correction in operation 727 is performed automatically according to the measurement of the sensor for the current environment.

Although many examples of the present invention are illustrated with a display device, it will be apparent to one skilled in the art from this description that various methods of the present invention can also be used with other color devices, such as scanners and printers.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method to manage colors for a color output device, the method comprising:

generating a first device profile for the color output device from a plurality of second device profiles for the color output device, wherein the first device profile is stored in a memory for use with the color output device, the first device profile corresponding to the color output device having a display operating under a first viewing condition with a first illumination of ambient light, the plurality of second device profiles corresponding to the color output device operating under a plurality of second viewing conditions with each of the second viewing conditions having a different type of illumination of ambient light, wherein the first device profile is generated from a combination of the plurality of second device profiles according to an input that indicates a relation between the first viewing condition and the plurality of second viewing conditions, and wherein the first device profile is generated independent of an image to be displayed.

2. The method as in claim 1 wherein each of the first device profile and the plurality of second device profiles specifies at least one of:
   a) gamma correction; and
   b) mapping between chromaticity of colors on the color output device and color data corresponding to the colors.

3. The method as in claim 1 wherein the color output device comprises one of:
   a printer;
   a display device; and
   a television set.

4. The method as in claim 1 wherein each of the first condition and the plurality of second conditions comprises at least one of:
   a) illumination of ambient light;
   b) chromaticity of ambient light;
   c) background color;
   d) characteristics of print media;
   e) humidity;
   f) temperature;
   g) pressure;
   h) ink level; and
   i) age of a light source.

5. The method as in claim 1 further comprising:
performing color correction for the color output device operating under the first condition using the first device profile.

6. The method as in claim 5 wherein said performing color correction comprises:
   converting between a first color data for the color output device operating under the first condition and a second color data according to the first device profile.

7. The method as in claim 1 wherein each of the first condition and the plurality of second conditions is quantified by at least one parameter; and, the first device profile is generated from an interpolation of the plurality of second device profiles according to the at least one parameter.

8. The method as in claim 7 wherein each of the first device profile and the plurality of second device profiles is defined in a device profile space; and, the interpolation according to the at least one parameter is constrained in a subspace of the device profile space.

9. The method as in claim 1 wherein the input is received from a user interface.

10. The method as in claim 9 wherein the input specifies weights for the plurality of second device profiles; and, the first device profile is an average of the plurality of second device profiles weighted according to the weights.

11. The method as in claim 10 further comprising:
   providing feedback to demonstrate one or more colors corrected according to the first device profile in response to the input.

12. The method as in claim 11 wherein the one or more colors comprise a plurality of grays including white and black.

13. The method as in claim 11 wherein the color output device comprises a display device; and, the feedback is displayed on the display device operating under the first condition.

14. The method as in claim 1 wherein the input is received from a sensor.

15. The method as in claim 14 wherein the sensor quantifies at least one parameter for the first condition; and, the first device profile is generated from an interpolation of the plurality of second device profiles according to the at least one parameter.

16. A data processing system to manage colors for a color output device, the data processing system comprising:
   memory, the memory storing a representation of a plurality of second device profiles for managing colors for the color output device having a display operating under a plurality of second viewing conditions with each of the second viewing conditions having a different type of illumination of ambient light respectively;
   a processor coupled to the memory, the processor generating a first device profile for the color output device operating under a first viewing condition with a first illumination of ambient light from the plurality of second device profiles, wherein the first device profile is generated from a combination of the plurality of second device profiles according to an input that indicates a relation between the first viewing condition and the plurality of second viewing conditions, and wherein the first device profile is generated independent of an image to be displayed.

17. The data processing system as in claim 16 wherein each of the first device profile and the plurality of second device profiles specifies at least one of:
   a) gamma correction; and
   b) mapping between chromaticity of colors on the color device and color data corresponding to the colors.

18. The data processing system as in claim 16 wherein the color output device comprises one of:
   a printer;
   a display device; and
   a television set.

19. The data processing system as in claim 16 wherein each of the first condition and the plurality of second conditions comprises at least one of:
   a) illumination of ambient light;
   b) chromaticity of ambient light;
   c) background color;
   d) characteristics of print media;
   e) humidity;
   f) temperature;
   g) pressure;
   h) ink level; and
   i) age of a light source.

20. The data processing system as in claim 16 wherein the processor performs color correction for the color output device operating under the first condition using the first device profile.

21. The data processing system as in claim 20 wherein the processor converts between a first color data for the color output device operating under the first condition and a second color data according to the first device profile to perform color correction.

22. The data processing system as in claim 16 wherein each of the first condition and the plurality of second conditions is quantified by at least one parameter; and, the first device profile is generated from an interpolation of the plurality of second device profiles according to the at least one parameter.

23. The data processing system as in claim 22 wherein each of the first device profile and the plurality of second device profiles is defined in a device profile space; and, the interpolation according to the at least one parameter is constrained in a subspace of the device profile space.

24. The data processing system as in claim 16 wherein the input is received from a user interface.

25. The data processing system as in claim 24 wherein the input specifies weights for the plurality of second device profiles; and the first device profile is an average of the plurality of second device profiles weighted according to the weights.

26. The data processing system as in claim 25 wherein the color output device comprises a display device coupled to the data processing system; and, the processor instructs the color output device to provide feedback to demonstrate one or more colors corrected according to the first device profile in response to the input.

27. The data processing system as in claim 26 wherein the feedback is displayed on the display device operating under the first condition.

28. The data processing system as in claim 26 wherein the one or more colors comprise a plurality of grays including white and black.

29. The data processing system as in claim 16 wherein the input is received from a sensor coupled to the data processing system.

30. The data processing system as in claim 29 wherein the sensor quantifies at least one parameter for the first condition; and, the first device profile is generated from an interpolation of the plurality of second device profiles according to the at least one parameter.

31. A machine readable non-transitory medium containing executable computer program instructions which when executed by a digital processing system cause said system to perform a method to manage colors for a color output device, the method comprising:
   generating a first device profile for the color output device from a plurality of second device profiles for the color output device, the first device profile corresponding to the color output device having a display operating under a first viewing condition with a first illumination of ambient light, the plurality of second device profiles corresponding to the color output device operating under a plurality of second viewing conditions with each of the second viewing conditions having a different type of illumination of ambient light, wherein the first device profile is generated from a combination of the plurality of second device profiles according to an input that indicates a relation between the first viewing condition and the plurality of second viewing conditions, and wherein the first device profile is generated independent of an image to be displayed.

32. The medium as in claim 31 wherein each of the first device profile and the plurality of second device profiles specifies at least one of:
   a) gamma correction; and
   b) mapping between chromaticity of colors on the color device and color data corresponding to the colors.

33. The medium as in claim 31 wherein the color output device comprises one of:
   a printer;
   a display device; and
   a television set.

34. The medium as in claim 31 wherein each of the first condition and the plurality of second conditions comprises at least one of:
   a) illumination of ambient light;
   b) chromaticity of ambient light;
   c) background color;
   d) characteristics of print media;
   e) humidity;
   f) temperature;
   g) pressure;
   h) ink level; and
   i) age of a light source.

35. The medium as in claim 31 wherein the method further comprises:
   performing color correction for the color output device operating under the first condition using the first device profile.

36. The medium as in claim 35 wherein said performing color correction comprises:
   converting between a first color data for the color output device operating under the first condition and a second color data according to the first device profile.

37. The medium as in claim 31 wherein each of the first condition and the plurality of second conditions is quantified by at least one parameter; and, the first device profile is generated from an interpolation of the plurality of second device profiles according to the at least one parameter.

38. The medium as in claim 37 wherein each of the first device profile and the plurality of second device profiles is defined in a device profile space; and, the interpolation according to the at least one parameter is constrained in a subspace of the device profile space.

39. The medium as in claim 31 wherein the input is received from a user interface.

40. The medium as in claim 39 wherein the input specifies weights for the plurality of second device profiles; and the first device profile is an average of the plurality of second device profiles weighted according to the weights.

41. The medium as in claim 40 wherein the method further comprises:
   providing feedback to demonstrate one or more colors corrected according to the first device profile in response to the input.

42. The medium as in claim 41 wherein the one or more colors comprise a plurality of grays including white and black.

43. The medium as in claim 41 wherein the color output device comprises a display device; and, the feedback is displayed on the display device operating under the first condition.

44. The medium as in claim 31 wherein the input is received from a sensor.

45. The medium as in claim 44 wherein the sensor quantifies at least one parameter for the first condition; and, the first device profile is generated from an interpolation of the plurality of second device profiles according to the at least one parameter.

46. A data processing system comprising:
   a color output device to display an image;
   memory coupled to the color output device; and means for generating a first device profile for the color output device from a plurality of second device profiles for the color output device, the first device profile corresponding to the color output device having a display operating under a first viewing condition with a first illumination of ambient light, the plurality of second device profiles corresponding to the color output device operating under a plurality of second viewing conditions with each of the second viewing conditions having a different type of illumination of ambient light, wherein the first device profile is generated from a combination of the plurality of second device profiles according to an input that indicates a relation between the first viewing condition and the plurality of second viewing conditions, and wherein the first device profile is generated independent of the image to be displayed.

47. The data processing system as in claim 46 wherein each of the first device profile and the plurality of second device profiles specifies at least one of:
   a) gamma correction; and
   b) mapping between chromaticity of colors on the color device and color data corresponding to the colors.

48. The data processing system as in claim 46 wherein the color output device comprises one of:
   a printer;
   a display device; and
   a television set.

49. The data processing system as in claim 46 wherein each of the first condition and the plurality of second conditions comprises at least one of:
   a) illumination of ambient light;
   b) chromaticity of ambient light;
   c) background color;
   d) characteristics of print media;
   e) humidity;
   f) temperature;
   g) pressure;
   h) ink level; and
   i) age of a light source.

50. The data processing system as in claim 46 further comprising:
   means for performing color correction for the color output device operating under the first condition using the first device profile.

51. The data processing system as in claim 50 wherein said means for performing color correction comprises:
   means for converting between a first color data for the color output device operating under the first condition and a second color data according to the first device profile.

52. The data processing system as in claim 46 wherein each of the first condition and the plurality of second conditions is quantified by at least one parameter; and, the first device profile is generated from an interpolation of the plurality of second device profiles according to the at least one parameter.

53. The data processing system as in claim 52 wherein each of the first device profile and the plurality of second device profiles is defined in a device profile space; and, the interpolation according to the at least one parameter is constrained in a subspace of the device profile space.

54. The data processing system as in claim 46 wherein the input is received from a user interface.

55. The data processing system as in claim 54 wherein the input specifies weights for the plurality of second device profiles; and the first device profile is an average of the plurality of second device profiles weighted according to the weights.

56. The data processing system as in claim 55 further comprising:
   means for providing feedback to demonstrate one or more colors corrected according to the first device profile in response to the input.

57. The data processing system as in claim 56 wherein the one or more colors comprise a plurality of grays including white and black.

58. The data processing system as in claim 56 wherein the color output device comprises a display device; and, the feedback is displayed on the display device operating under the first condition.

59. The data processing system as in claim 46 wherein the input is received from a sensor.

60. The data processing system as in claim 59 wherein the sensor quantifies at least one parameter for the first condition; and, the first device profile is generated from an interpolation of the plurality of second device profiles according to the at least one parameter.

* * * * *